(12) United States Patent
Zhou et al.

(10) Patent No.: US 12,532,260 B2
(45) Date of Patent: Jan. 20, 2026

(54) WAKEUP SIGNAL SELECTED CELL INDICATION

(71) Applicant: QUALCOMM Incorporated, San Diego, CA (US)

(72) Inventors: Yan Zhou, San Diego, CA (US); Qian Zhang, Basking Ridge, NJ (US); Wooseok Nam, San Diego, CA (US); Sony Akkarakaran, Poway, CA (US); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/243,356

(22) Filed: Apr. 28, 2021

(65) Prior Publication Data

US 2021/0345247 A1 Nov. 4, 2021

Related U.S. Application Data

(60) Provisional application No. 63/018,438, filed on Apr. 30, 2020.

(51) Int. Cl.
*H04W 52/02* (2009.01)
*H04W 76/11* (2018.01)
(Continued)

(52) U.S. Cl.
CPC ........ *H04W 52/0229* (2013.01); *H04W 76/11* (2018.02); *H04W 76/28* (2018.02); *H04W 76/27* (2018.02)

(58) Field of Classification Search
CPC . H04W 52/0229; H04W 36/08; H04W 76/11; H04W 76/28; H04W 36/00835;
(Continued)

(56) References Cited

U.S. PATENT DOCUMENTS 10,743,232 B1 * 8/2020 Mehta .................. H04W 36/30
2016/0227428 A1 * 8/2016 Novlan ................ H04W 48/16
(Continued)

FOREIGN PATENT DOCUMENTS

CN 110876185 A 3/2020

OTHER PUBLICATIONS

3GPP TSG RAN WG1 Meeting #95; R1-1812891, Source: CMCC, Title: Discussion on CSI report enhancement for CDRX, Spokane, USA, Nov. 12-16, 2018. (Year: 2018).*
(Continued)

*Primary Examiner* — Mohammed S Chowdhury
(74) *Attorney, Agent, or Firm* — Holland & Hart LLP

(57) ABSTRACT

Methods, systems, and devices for wireless communications are described. A user equipment (UE) may receive, prior to a first on duration of a discontinuous reception cycle, a first indication that the UE is to remain in an inactive state of the discontinuous reception cycle during the first on duration. The UE may receive, prior to a second on duration of the discontinuous reception cycle, a second indication that the UE is to transition to an active state during the second on duration, wherein the second indication indicates, based at least in part on the first indication indicating that the UE is to remain in the inactive state during the first on duration, and one or more physical cell identifiers for the UE to communicate with while in the active state. The UE may identify the one or more physical cell identifiers indicated in the second indication.

20 Claims, 18 Drawing Sheets

(51) Int. Cl.
  *H04W 76/27* (2018.01)
  *H04W 76/28* (2018.01)
(58) Field of Classification Search
  CPC . H04W 76/27; H04W 88/02; H04W 52/0235; H04W 8/26; H04W 28/0226; H04W 36/0005; H04W 36/0016; H04W 36/0058; H04W 36/0079; H04W 36/0083; H04W 36/00837; H04W 36/0085; H04W 36/0088; H04W 36/0094; H04W 36/026; H04W 36/22; H04W 36/305; H04W 40/36; H04W 52/40; Y02D 30/70
  See application file for complete search history.

(56) References Cited

U.S. PATENT DOCUMENTS

| | | | |
|---|---|---|---|
| 2020/0037247 A1 | 1/2020 | Liao et al. | |
| 2020/0351784 A1* | 11/2020 | Tsai | H04L 5/0094 |
| 2021/0022075 A1* | 1/2021 | Xu | H04W 72/0453 |
| 2021/0168747 A1* | 6/2021 | Wong | H04W 52/0216 |
| 2021/0195521 A1* | 6/2021 | Müller | H04W 52/0216 |
| 2021/0250865 A1* | 8/2021 | Turtinen | H04W 52/0225 |
| 2021/0314866 A1* | 10/2021 | Lee | H04W 76/28 |
| 2021/0377852 A1* | 12/2021 | Zhou | H04W 76/28 |
| 2022/0015188 A1* | 1/2022 | Bao | H04W 72/1263 |
| 2022/0095231 A1* | 3/2022 | Maleki | H04W 52/0216 |
| 2022/0141732 A1* | 5/2022 | Wu | H04W 36/0055 370/331 |
| 2022/0174519 A1* | 6/2022 | Chou | H04W 24/08 |
| 2022/0182943 A1* | 6/2022 | Maleki | H04W 68/025 |
| 2022/0217628 A1* | 7/2022 | Shubhi | H04W 52/028 |
| 2022/0217635 A1* | 7/2022 | Lee | H04W 72/0446 |
| 2022/0225151 A1* | 7/2022 | Zhang | H04W 24/10 |
| 2022/0264462 A1* | 8/2022 | Bao | H04W 52/0274 |
| 2022/0264696 A1* | 8/2022 | Bao | H04W 76/28 |
| 2024/0137868 A1* | 4/2024 | Shubhi | H04W 52/0235 |
| 2024/0147368 A1* | 5/2024 | Shubhi | H04W 52/0235 |

OTHER PUBLICATIONS

3GPP TSG-RAN2 Meeting #105bis; R2-1904149, Source: Ericsson, Title: Impact of WUS on cDRX, Xi'an, China, Apr. 8-12, 2019 (Year: 2019).*
3GPP TSG-RAN WG2 Meeting #106 ; R2-1905603; Source: OPPO; Title: Impacts of PDCCH-based wake up signaling, Reno, USA , May 13-May 17, 2019 (Year: 2019).*
3GPP TSG-RAN2# 106; R2-1906484; Source: Xiaomi Communications; Title: Discussion on how the WUS works with C-DRX, Reno, USA, May 13-17, 2019 (Year: 2019).*
3GPP TSG-RAN WG2 Meeting#107bis; R2-1913735; Source: Huawei, HiSilicon; Title: DRX configuration coordination in (NG) EN-DC, Chongqing, China, Oct. 14-18, 2019. (Year: 2019).*
3GPP TSG-RAN WG2 Meeting #109 electronic; R2-2002836, Source: OPPO; Title: Further considerations on secondary DRX group, Apr. 20-Apr. 30, 2020. (Year: 2020).*
3GPP TSG-RAN WG2 #109bis-e; R2-2003103; Source: Xiaomi Communications; Title: Discussion on PDCCH-WUS works with Dual DRX, Electronic Meeting, Apr. 20-30, 2020. (Year: 2020).*
3GPP TSG RAN WG1 Meeting #97; R1-1906353; Source: CATT; Title: PDCCH skipping and switching of PDCCH monitoring periodicity; Reno, USA, May 13-17, 2019 (Year: 2019).*
3GPP TSG-RAN WG1 Meeting #97; Tdoc R1-1907329; Source: Ericsson; Title: Discovery and mitigation of WUS miss detection; Reno, USA, May 13-17, 2019. (Year: 2019).*
3GPP TSG RAN WG1 #98; R1-1908435; Source: NEC; Title: Discussion on PDCCH-based Power Saving Signal/Channel for wake up; Prague, Czech Republic, Aug. 26-30, 2019. (Year: 2019).*
Ericsson: "Discovery and Mitigation of WUS Miss Detection", 3GPP Draft, 3GPP TSG-RAN WG1 Meeting #97, R1-1907329, Discovery and Mitigation of WUS Miss Detection, 3rd Generation Partnership Project (3GPP), Mobile Competence Centre, 650, Route Des Lucioles, F-06921 Sophia-Antipolis Cedex, vol. RAN WG1, No. Reno, USA, May 13, 2019-May 17, 2019, May 13, 2019 (May 13, 2019), pp. 1-2, XP051728768, Retrieved from the Internet: URL: http://www.3gpp.org/ftp/Meetings%5F3GPP%5FSYNC/RAN1/Docs/R1%2D1907329%2Ezip. [Retrieved on May 13, 2019], Section 2.1.
Intel Corporation: "WUS Consideration for efeMTC", 3GPP Draft, 3GPP TSG RAN WG2 Meeting #99bis, R2-1710641, WUS, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Oct. 9, 2017-Oct. 13, 2017, Oct. 8, 2017 (Oct. 8, 2017), XP051342675, 7 Pages, Retrieved from the Internet: URL:http://www.3gpp.org/ftp/Meetings_3GPP_SYNC/RAN2/Docs/ [retrieved on Oct. 8, 2017].
International Search Report and Written Opinion—PCT/US2021/029858—ISA/EPO—Aug. 6, 2021.
Nokia, et al., "Reducing System Acquisition Time for efeMTC", 3GPP Draft, 3GPP TSG RAN WG1 Meeting #91, R1-1720126, Reducing System Acquisition Time for efeMTC, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27, 2017-Dec. 1, 2017, Nov. 17, 2017 (Nov. 17, 2017), XP051368899, 3 Pages, Retrieved from the Internet: URL: http://www.3gpp.org/ftp/tsg%5Fran/WG1%5FRL1/TSGR1%5F91/Docs/. [Retrieved on Nov. 17, 2017] 1 Introduction 2 Reducing System Acquisition Time 3 Conclusion.
Sony (Updated Revision R2-1712993): "WUS Aspects on Grouping and Mobility for efeMTC and feNB-IoT", 3GPP Draft, 3GPP TSG RAN WG2 Meeting #101, R2-1803134, WUS Aspects on Grouping and Mobility for efeMTC and feNB-IoT, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 26, 2018-Mar. 2, 2018, Feb. 15, 2018 (Feb. 15, 2018), pp. 1-6, XP051399692, Retrieved from the Internet: URL: https://www.3gpp.org/ftp/tsg_ran/WG2_RL2/TSGR2_101/Docs/. [Retrieved on Feb. 15, 2018], Paragraphs [0002]' [02 .1], [02. 2].
Vivo: "WUS Co-Operation With C-DRX", 3GPP Draft, 3GPP TSG-RAN WG2 Meeting #106, R2-1905955, Wus Cooperation with C-DRX, 3rd Generation Partnership Project (3GPP), Mobile Competence Centre, 650, Route Des Lucioles, F-06921 Sophia-Antipolis Cedex, France, vol. RAN WG2, No. Reno, USA, May 13, 2019-May 17, 2019, May 3, 2019 (May 3, 2019), XP051710301, 6 Pages, Retrieved from the Internet: URL: http://www.3gpp.org/ftp/tsg%5Fran/WG2%5FRL2/TSGR2%5F106/Docs/R2%2D1905955%2Ezip. [Retrieved on May 3, 2019] 1. Introduction 2. Discussion (Alt.3) figure 3 6.3 Higher Layer Procedure for the UE Power Saving Schemes in RRC Connected (p. 5).
Nokia, et al., "Reducing System Acquisition Time for efeMTC", 3GPP TSG RAN WG1 Meeting #91, R1-1720126, Reno, USA, Nov. 27, 2017-Dec. 1, 2017, 3 Pages, Nov. 18, 2017.
Vivo: "WUS Co-Operation With C-DRX", 3GPP TSG-RAN WG2 Meeting #106, R2-1905955, Reno, USA, May 13, 2019-May 17, 2019, 6 Pages, May 3, 2019.
Apple Inc: "PDCCH Based Power Saving Channel Design for UE Power Saving", 3GPP TSG RAN WG1 #99, R1-1912827, Reno, USA, Nov. 18, 2019-Nov. 22, 2019, Nov. 9, 2019, pp. 1-11.
LG Electronics: "Discussion on PDCCH-Based Power Saving Signal/Channel", 3GPP TSG RAN WG1 #99, R1-1912404, Reno, USA, Nov. 18, 2019-Nov. 22, 2019, Nov. 9, 2019, 5 pages.
NEC: "Discussion on PDCCH-Based Power Saving Signal/Channel for Wake Up", 3GPP TSG RAN WG1 #98, R1-1908435, 3rd Generation Partnership Project (3GPP), Mobile Competence Centre, 650, Route Des Lucioles, F-06921, Sophia-Antipolis Cedex, France, vol. RAN WG1, No. Prague, Czech Republic, Aug. 26, 2019-Aug. 30, 2019, Aug. 16, 2019, 4 Pages.
3GPP: "3rd Generation Partnership Project; Technical Specification Group Radio Access Network; NR; Physical layer procedures for control (Release 16)", 3GPP TS 38.213 V16.1.0 (Mar. 2020), Section 10.3, Mar. 2020, 3GPP Organizational Partners, Sophia Antipolis Valbonne, France, 5 pages.
3GPP: "3rd Generation Partnership Project; Technical Specification Group Radio Access Network; NR; Medium Access Control (MAC)

(56) References Cited

OTHER PUBLICATIONS protocol specification (Release 16)", 3GPP TS 38.321 V16.0.0 (Mar. 2020), Section 5.7, Mar. 2020, 3GPP Organizational Partners, Sophia Antipolis Valbonne, France, 6 pages.
3GPP: 3rd Generation Partnership Project; Technical Specification Group Radio Access Network; NR; Radio Resource Control (RRC) protocol specification (Release 16), 3GPP TS 38.331 V16.0.0 (Mar. 2020), Section 6.3.2, Mar. 2020, 3GPP Organizational Partners, Sophia Antipolis Valbonne, France, 309 pages.

\* cited by examiner

WAKEUP SIGNAL SELECTED CELL INDICATION

CROSS REFERENCE

The present application for patent claims the benefit of U.S. Provisional Patent Application No. 63/018,438 by ZHOU et al., entitled "WAKEUP SIGNAL SELECTED CELL INDICATION," filed Apr. 30, 2020, assigned to the assignee hereof, and expressly incorporated by reference herein.

FIELD OF TECHNOLOGY

The following relates generally to wireless communications and more specifically to wakeup signal selected cell indication for mobility.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may be configured with multiple candidate cells to communicate with a wireless communications network. The UE may be configured to communicate with a subset of the candidate cells for a duration. Some techniques for configuring and managing the UE and the subset of candidate cells based on inter-cell mobility can be improved.

SUMMARY

The described techniques relate to improved methods, systems, devices, and apparatuses that support wakeup signal (WUS) selected cell indication for mobility. Generally, the described techniques provide various mechanisms that support wireless communications in a wireless network. Broadly, aspects of the described techniques support various mechanisms to improve wakeup signaling when a user equipment (UE) is operating in a discontinuous reception (DRX) cycle. In particular, the techniques described herein provide various rules, procedures, actions, etc., that may be implemented in the context of a WUS, as well as other signaling options instead of a purely WUS based signaling. Examples of such techniques include, but are not limited to, the WUS indicating physical cell identifier(s) (PCI)(s) when the previous WUS indicates the UE is to remain in an idle state. Another example includes, a default configuration being configured and applied when the UE does not detect the WUS, e.g., whether the UE is to remain awake or go back to sleep for the corresponding on duration. In another example, the WUS can be used to carry or otherwise convey acknowledgement/negative-acknowledgement (ACK/NACK) resources. The ACK/NACK resources can be used by the UE to confirm receipt of the WUS, e.g., that the UE has successfully decoded the WUS. Another example includes the WUS indicating the PCI(s) based on an offset between the WUS and the application time of the indicate PCI(s), e.g., when the indicated PCI(s) are available for communicating with the UE. Aspects of this example may be based on the capabilities of the UE. In another example, a downlink control information (DCI) may be used to indicate the PCI(s) during the on duration following the WUS. Another example may include splitting the indication of the PCI(s) between the WUS and a downlink signal transmitted during the on duration following the WUS. Accordingly, the described techniques provide various mechanisms than can be implemented in a WUS scenario that can improve the information being communicated, reduce signaling overhead, improve reliability, and the like, for the wireless communication system.

A method of wireless communication at a UE is described. The method may include receiving, prior to a first on duration of a DRX cycle, a first indication that the UE is to remain in an inactive state of the DRX cycle during the first on duration, receiving, prior to a second on duration of the DRX cycle, a second indication that the UE is to transition to an active state during the second on duration, where the second indication indicates, based on the first indication indicating that the UE is to remain in the inactive state during the first on duration, and one or more PCIs for the UE to communicate with while in the active state, and identifying the one or more PCIs indicated in the second indication.

An apparatus for wireless communication at a UE is described. The apparatus may include a processor, memory coupled with the processor, and instructions stored in the memory. The instructions may be executable by the processor to cause the apparatus to receive, prior to a first on duration of a DRX cycle, a first indication that the UE is to remain in an inactive state of the DRX cycle during the first on duration, receive, prior to a second on duration of the DRX cycle, a second indication that the UE is to transition to an active state during the second on duration, where the second indication indicates, based on the first indication indicating that the UE is to remain in the inactive state during the first on duration, and one or more PCIs for the UE to communicate with while in the active state, and identify the one or more PCIs indicated in the second indication.

Another apparatus for wireless communication at a UE is described. The apparatus may include means for receiving, prior to a first on duration of a DRX cycle, a first indication that the UE is to remain in an inactive state of the DRX cycle during the first on duration, receiving, prior to a second on duration of the DRX cycle, a second indication that the UE is to transition to an active state during the second on duration, where the second indication indicates, based on the first indication indicating that the UE is to remain in the inactive state during the first on duration, and one or more PCIs for the UE to communicate with while in the active state, and identifying the one or more PCIs indicated in the second indication.

A non-transitory computer-readable medium storing code for wireless communication at a UE is described. The code may include instructions executable by a processor to receive, prior to a first on duration of a DRX cycle, a first indication that the UE is to remain in an inactive state of the DRX cycle during the first on duration, receive, prior to a second on duration of the DRX cycle, a second indication that the UE is to transition to an active state during the second on duration, where the second indication indicates, based on the first indication indicating that the UE is to remain in the inactive state during the first on duration, and one or more PCIs for the UE to communicate with while in the active state, and identify the one or more PCIs indicated in the second indication.

Some examples of the method, apparatuses, and non-transitory computer-readable medium described herein may further include operations, features, means, or instructions for monitoring reference signals, during the first on duration, associated with the identified one or more PCIs, and transmitting, during the first on duration, a channel status report based on the monitoring.

In some examples of the method, apparatuses, and non-transitory computer-readable medium described herein, the channel status report may be transmitted to a base station associated with the first indication and the second indication.

Some examples of the method, apparatuses, and non-transitory computer-readable medium described herein may further include operations, features, means, or instructions for performing a cell switching procedure with a serving cell associated with at least one of the identified one or more PCIs.

In some examples of the method, apparatuses, and non-transitory computer-readable medium described herein, the serving cell includes at least one of one or more transmission reception points of a same serving cell or one or more serving cells in a group of candidate serving cells.

In some examples of the method, apparatuses, and non-transitory computer-readable medium described herein, the first indication may be received in a first WUS and the second indication may be received in a second WUS.

A method of wireless communication at a UE is described. The method may include receiving, prior to an on duration of a DRX cycle, an indication that the UE is to transition to an active state during the on duration, identifying, based on the indication, one or more PCIs for the UE to communicate with during the on duration, the one or more PCIs being indicated based on an activation period associated with a corresponding serving cell associated with the one or more PCIs, and communicating with at least one serving cell associated with the one or more PCIs during the on duration.

An apparatus for wireless communication at a UE is described. The apparatus may include a processor, memory coupled with the processor, and instructions stored in the memory. The instructions may be executable by the processor to cause the apparatus to receive, prior to an on duration of a DRX cycle, an indication that the UE is to transition to an active state during the on duration, identify, based on the indication, one or more PCIs for the UE to communicate with during the on duration, the one or more PCIs being indicated based on an activation period associated with a corresponding serving cell associated with the one or more PCIs, and communicate with at least one serving cell associated with the one or more PCIs during the on duration.

Another apparatus for wireless communication at a UE is described. The apparatus may include means for receiving, prior to an on duration of a DRX cycle, an indication that the UE is to transition to an active state during the on duration, identifying, based on the indication, one or more PCIs for the UE to communicate with during the on duration, the one or more PCIs being indicated based on an activation period associated with a corresponding serving cell associated with the one or more PCIs, and communicating with at least one serving cell associated with the one or more PCIs during the on duration.

A non-transitory computer-readable medium storing code for wireless communication at a UE is described. The code may include instructions executable by a processor to receive, prior to an on duration of a DRX cycle, an indication that the UE is to transition to an active state during the on duration, identify, based on the indication, one or more PCIs for the UE to communicate with during the on duration, the one or more PCIs being indicated based on an activation period associated with a corresponding serving cell associated with the one or more PCIs, and communicate with at least one serving cell associated with the one or more PCIs during the on duration.

Some examples of the method, apparatuses, and non-transitory computer-readable medium described herein may further include operations, features, means, or instructions for transmitting a UE capability message indicating a cell switching time of the UE to switch to a new serving cell, where the one or more PCIs may be included in the indication based on the cell switching time of the UE and the activation period of each corresponding serving cell.

Some examples of the method, apparatuses, and non-transitory computer-readable medium described herein may further include operations, features, means, or instructions for performing a cell switching procedure with a serving cell associated with at least one of the identified one or more PCIs.

In some examples of the method, apparatuses, and non-transitory computer-readable medium described herein, the serving cell includes at least one of one or more transmission reception points of a same serving cell or one or more serving cells in a group of candidate serving cells.

In some examples of the method, apparatuses, and non-transitory computer-readable medium described herein, the indication may be received in at least one of a WUS or a non-WUS DCI.

A method of wireless communication at a UE is described. The method may include receiving, prior to an on duration of a DRX cycle, an indication that the UE is to transition to an active state during the on duration and one or more PCIs for the UE to communicate with, receiving a configuration, based on the indication, of one or more resources for transmitting a feedback signal acknowledging that the UE was able to successfully decode the indication, transitioning to the active state during the on duration based on the indication, and transmitting the feedback signal while in the active state and using the one or more resources.

An apparatus for wireless communication at a UE is described. The apparatus may include a processor, memory coupled with the processor, and instructions stored in the memory. The instructions may be executable by the processor to cause the apparatus to receive, prior to an on duration of a DRX cycle, an indication that the UE is to transition to an active state during the on duration and one or more PCIs for the UE to communicate with, receive a configuration, based on the indication, of one or more resources for transmitting a feedback signal acknowledging that the UE was able to successfully decode the indication, transition to the active state during the on duration based on the indication, and transmit the feedback signal while in the active state and using the one or more resources.

Another apparatus for wireless communication at a UE is described. The apparatus may include means for receiving, prior to an on duration of a DRX cycle, an indication that the UE is to transition to an active state during the on duration and one or more PCIs for the UE to communicate with, receiving a configuration, based on the indication, of one or more resources for transmitting a feedback signal acknowledging that the UE was able to successfully decode the indication, transitioning to the active state during the on duration based on the indication, and transmitting the feedback signal while in the active state and using the one or more resources.

A non-transitory computer-readable medium storing code for wireless communication at a UE is described. The code may include instructions executable by a processor to receive, prior to an on duration of a DRX cycle, an indication that the UE is to transition to an active state during the on duration and one or more PCIs for the UE to communicate with, receive a configuration, based on the indication, of one or more resources for transmitting a feedback signal acknowledging that the UE was able to successfully decode the indication, transition to the active state during the on duration based on the indication, and transmit the feedback signal while in the active state and using the one or more resources.

In some examples of the method, apparatuses, and non-transitory computer-readable medium described herein, the feedback signal may be transmitted during the on duration or after the on duration.

Some examples of the method, apparatuses, and non-transitory computer-readable medium described herein may further include operations, features, means, or instructions for performing a cell switching procedure with a serving cell associated with at least one of the one or more PCIs.

In some examples of the method, apparatuses, and non-transitory computer-readable medium described herein, the serving cell includes at least one of one or more transmission reception points of a same serving cell or one or more serving cells in a group of candidate serving cells.

In some examples of the method, apparatuses, and non-transitory computer-readable medium described herein, the indication may be received in a WUS.

In some examples of the method, apparatuses, and non-transitory computer-readable medium described herein, the feedback signal includes a hybrid automatic/repeat request (HARQ) ACK/NACK message.

A method of wireless communication at a UE is described. The method may include identifying a default configuration associated with failing to detect an indication of whether the UE is to transition to an active state or remain in an inactive state during an on duration of a DRX cycle during a corresponding monitoring period and applying, based at least in response to failing to detect the indication, the default configuration during the on duration.

An apparatus for wireless communication at a UE is described. The apparatus may include a processor, memory coupled with the processor, and instructions stored in the memory. The instructions may be executable by the processor to cause the apparatus to identify a default configuration associated with failing to detect an indication of whether the UE is to transition to an active state or remain in an inactive state during an on duration of a DRX cycle during a corresponding monitoring period and apply, based at least in response to failing to detect the indication, the default configuration during the on duration.

Another apparatus for wireless communication at a UE is described. The apparatus may include means for identifying a default configuration associated with failing to detect an indication of whether the UE is to transition to an active state or remain in an inactive state during an on duration of a DRX cycle during a corresponding monitoring period and applying, based at least in response to failing to detect the indication, the default configuration during the on duration.

A non-transitory computer-readable medium storing code for wireless communication at a UE is described. The code may include instructions executable by a processor to identify a default configuration associated with failing to detect an indication of whether the UE is to transition to an active state or remain in an inactive state during an on duration of a DRX cycle during a corresponding monitoring period and apply, based at least in response to failing to detect the indication, the default configuration during the on duration.

In some examples of the method, apparatuses, and non-transitory computer-readable medium described herein, applying the default configuration may include operations, features, means, or instructions for transitioning to the active state during the on duration based on failing to detect the indication.

Some examples of the method, apparatuses, and non-transitory computer-readable medium described herein may further include operations, features, means, or instructions for remaining in the active state until a monitoring occasion associated with detecting a second indication.

In some examples of the method, apparatuses, and non-transitory computer-readable medium described herein, applying the default configuration may include operations, features, means, or instructions for remaining in the inactive state during the on duration based on failing to detect the indication.

Some examples of the method, apparatuses, and non-transitory computer-readable medium described herein may further include operations, features, means, or instructions for remaining in the inactive state until a monitoring occasion associated with detecting a second indication.

Some examples of the method, apparatuses, and non-transitory computer-readable medium described herein may further include operations, features, means, or instructions for receiving a configuration signal indicating the default configuration.

In some examples of the method, apparatuses, and non-transitory computer-readable medium described herein, the configuration signal includes at least one of a DCI, or a medium access control (MAC) control element (CE), or a radio resource control (RRC) signal, or a combination thereof.

DETAILED DESCRIPTION

Figure 1:
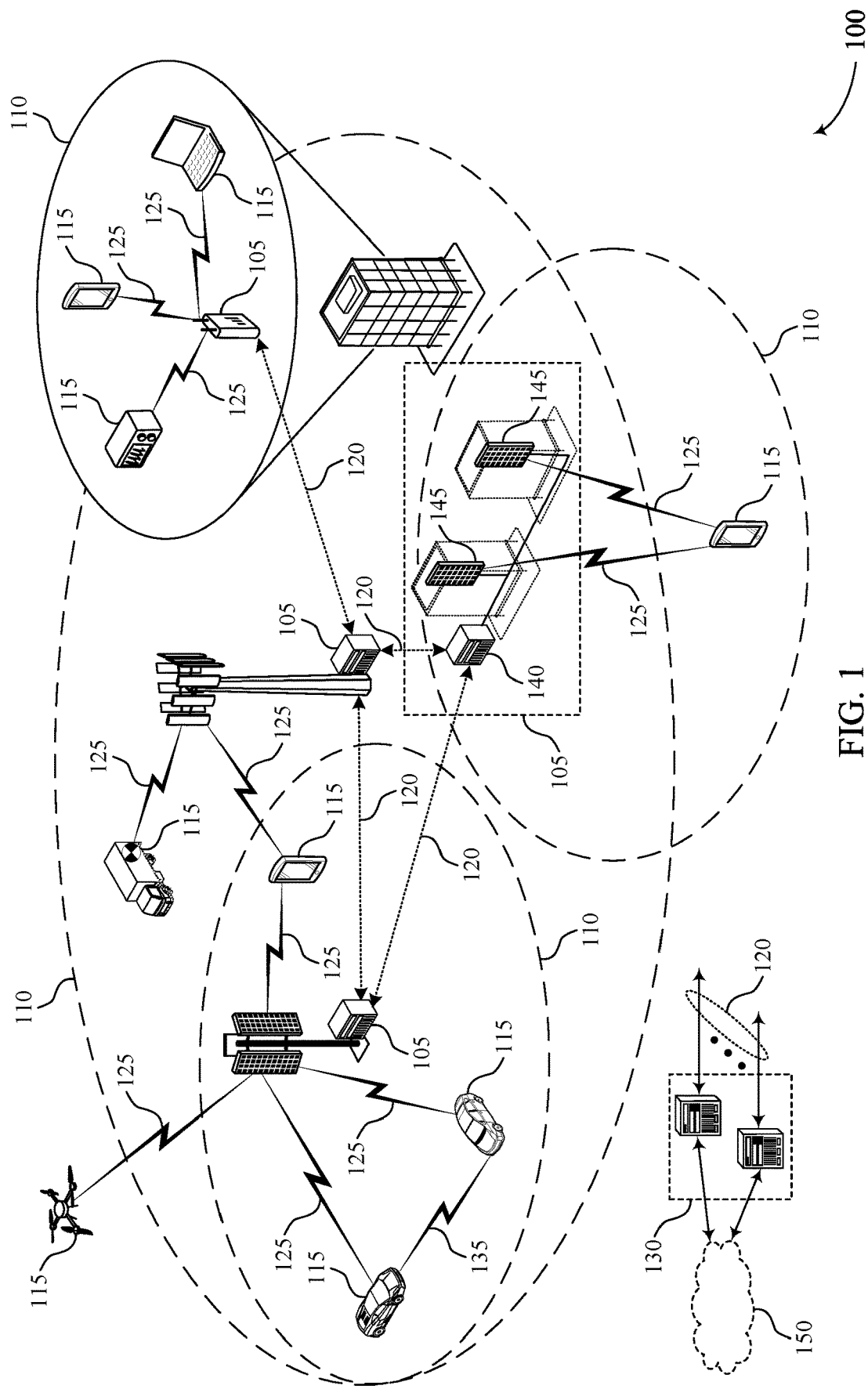
FIG. 1 illustrates an example of a system for wireless communications that supports wakeup signal (WUS) selected cell indication for mobility in accordance with aspects of the present disclosure.

A user equipment (UE) in a wireless communication system may be served by multiple cells. The UE may be handed over or reassigned to different cells over time as channel conditions change, as the UE moves, to balance network load, etc. In some cases, there may be two modes associated with the UE being served by multiple cells.

In a first mode, each serving cell may have multiple transmission/reception points (TRPs) at different locations, and each TRP may have a different physical cell indicator (PCI). The UE may be served by a subset of PCIs (e.g., candidate PCIs) of a serving cell, and the subset of selected PCIs may be changed, for example via downlink control information (DCI) or a medium access control (MAC) control element (CE). In a second mode, the UE may be configured with a group of serving cells with a single PCI per serving cell. The UE may be served by a selected subset of the group of serving cells, which can be changed via DCI or MAC CE.

In some wireless communication systems, the UE may begin operations according to a discontinuous reception (DRX) cycle. The DRX cycle may include the UE operating in an idle state, in a connected DRX (C-DRX) state, or an active state. In the idle state, the UE powers down components/functions to conserve power since there are no active ongoing communications. In the C-DRX state, the UE powers down some components/functions, but maintains a degree of access stratum synchronization with its base station in order to more quickly transition to an active state for communications. In the active state, the UE is fully activated and available for communications. The DRX cycle may include the UE periodically awakening during an ON duration of the DRX cycle to monitor for a communication indication from its base station. Some wireless communication systems may support wakeup signaling where a small wakeup signal (WUS) is transmitted just before an ON duration that tells the UE whether it can sleep during the upcoming ON duration or can remain in the idle/C-DRX state during the ON duration. Some wireless communication systems allow the base station to include an indication of PCI(s) in the WUS. However, such techniques are limited and do not fully utilize the WUS functionality to convey, explicitly or implicitly, additional information/functionality for the devices operating in the wireless communication system.

Aspects of the disclosure are initially described in the context of wireless communication systems. Broadly, aspects of the described techniques support various mechanisms to improve wakeup signaling when a UE is operating in a DRX cycle. In particular, the techniques described herein provide various rules, procedures, actions, etc., that may be implemented in the context of a WUS, as well as other signaling options instead of a purely WUS based signaling. Examples of such techniques include, but are not limited to, the WUS indicating PCI(s) when the previous WUS indicates the UE is to remain in an idle state. Another example includes, a default configuration being configured and applied when the UE does not detect the WUS, e.g., whether the UE is to remain awake or go back to sleep for the corresponding on duration. In another example, the WUS can be used to carry or otherwise convey acknowledgement/negative-acknowledgement (ACK/NACK) resources. The ACK/NACK resources can be used by the UE to confirm receipt of the WUS, e.g., that the UE has successfully decoded the WUS. Another example includes the WUS indicating the PCI(s) based on an offset between the WUS and the application time of the indicate PCI(s), e.g., when the indicated PCI(s) are available for communicating with the UE. Aspects of this example may be based on the capabilities of the UE. In another example, a DCI may be used to indicate the PCI(s) during the on duration following the WUS. Another example may include splitting the indication of the PCI(s) between the WUS and a downlink signal transmitted during the on duration following the WUS. Accordingly, the described techniques provide various mechanisms than can be implemented in a WUS scenario that can improve the information being communicated, reduce signaling overhead, improve reliability, and the like, for the wireless communication system.

Aspects of the disclosure are further illustrated by and described with reference to apparatus diagrams, system diagrams, and flowcharts that relate to WUS selected cell indication for mobility.

FIG. 1 illustrates an example of a wireless communication system 100 that supports WUS selected cell indication for mobility in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive, prior to a first on duration of a DRX cycle, a first indication that the UE 115 is to remain in an inactive state of the DRX cycle during the first on duration. The UE 115 may receive, prior to a second on duration of the DRX cycle, a second indication that the UE 115 is to transition to an active state during the second on duration, wherein the second indication indicates, based at least in part on the first indication indicating that the UE 115 is to remain in the inactive state during the first on duration, and one or more PCIs for the UE 115 to communicate with while in the active state. The UE 115 may identify the one or more PCIs indicated in the second indication.

A UE 115 may receive, prior to an on duration of a DRX cycle, an indication that the UE 115 is to transition to an active state during the on duration. The UE 115 may identify, based at least in part on the indication, one or more PCIs for the UE 115 to communicate with during the on duration, the one or more PCIs being indicated based at least in part on an activation period associated with a corresponding serving cell associated with the one or more PCIs. The UE 115 may communicate with at least one serving cell associated with the one or more PCIs during the on duration.

A UE 115 may receive, prior to an on duration of a DRX cycle, an indication that the UE 115 is to transition to an active state during the on duration and one or more PCIs for the UE 115 to communicate with. The UE 115 may receive a configuration, based at least in part on the indication, of one or more resources for transmitting a feedback signal acknowledging that the UE 115 was able to successfully decode the indication. The UE 115 may transition to the active state during the on duration based at least in part on the indication. The UE 115 may transmit the feedback signal while in the active state and using the one or more resources.

A UE 115 may identify a default configuration associated with failing to detect an indication of whether the UE 115 is to transition to an active state or remain in an inactive state during an on duration of a DRX cycle during a corresponding monitoring period. The UE 115 may apply, based at least in response to failing to detect the indication, the default configuration during the on duration.

A UE 115 may receive, while in an active state and during a first on duration of a DRX cycle, a downlink grant identifying one or more PCIs for the UE 115 to communicate with. The UE 115 may receive, prior to a second on duration of the DRX cycle, an indication that the UE 115 is to transition to an active state of the DRX cycle during the second on duration. The UE 115 may transition to the active state during the second on duration according to the indication.

A UE 115 may receive, prior to an on duration of a DRX cycle, an indication that the UE 115 is to transition to an active state of a DRX cycle during the on duration. The UE 115 may identify, based at least in part on the indication, a first subset of one or more PCIs for the UE 115 to communicate with. The UE 115 may transition to the active state during the on duration according to the indication. The UE 115 may receive, while in the active state, a downlink signal identifying a second subset of one or more PCIs for the UE 115 to communicate with.

A base station 105 may transmit, to a UE 115 and prior to a first on duration of a DRX cycle, a first indication that the UE 115 is to remain in an inactive state of the DRX cycle during the first on duration. The base station 105 may determine one or more PCIs for the UE 115 to communicate with. The base station 105 may transmit, prior to a second on duration of the DRX cycle, a second indication that the UE 115 is to transition to an active state during the second on duration, wherein the second indication indicates, based at least in part on the first indication indicating that the UE 115 is to remain in the inactive state during the first on duration, and the one or more PCIs for the UE 115 to communicate with while in the active state.

A base station 105 may identify, for a UE 115 and based at least in part on an activation period of a serving cell, one or more PCIs available for the UE 115 to communicate with. The base station 105 may transmit, prior to an on duration of a DRX cycle of the UE 115, an indication that the UE 115 is to transition to an active state during the on duration and identifying the one or more PCIs.

A base station 105 may determine one or more resources for a UE 115 to use for transmitting a feedback signal. The base station 105 may transmit, prior to an on duration of a DRX cycle, an indication that the UE 115 is to transition to an active state during the on duration, identifying one or more PCIs for the UE 115 to communicate with, and identifying the one or more resources. The base station 105 may receive the feedback signal over the one or more resources, the feedback signal acknowledging that the UE 115 was able to successfully decode the indication.

A base station 105 may identify, for a UE 115, a default configuration associated with the UE 115 failing to detect an indication of whether the UE 115 is to transition to an active state or remain in an inactive state during an on duration of a DRX cycle during a corresponding monitoring period. The base station 105 may transmit a configuration signal to the UE 115 indicating the default configuration.

A base station 105 may transmit, to a UE 115 and while the UE 115 is in an active state during a first on duration of a DRX cycle, a downlink grant identifying one or more PCIs for the UE 115 to communicate with. The base station 105 may transmit, prior to a second on duration of the DRX cycle, an indication that the UE 115 is to transition to an active state of the DRX cycle during the second on duration.

A base station 105 may transmit, to a UE 115 and prior to an on duration of a DRX cycle, an indication that the UE 115 is to transition to an active state of a DRX cycle during the on duration, the indication identifying a first subset of one or more PCIs for the UE 115 to communicate with. The base station 105 may transmit, during the on duration, a downlink signal identifying a second subset of one or more PCIs for the UE 115 to communicate with.

Figure 2:
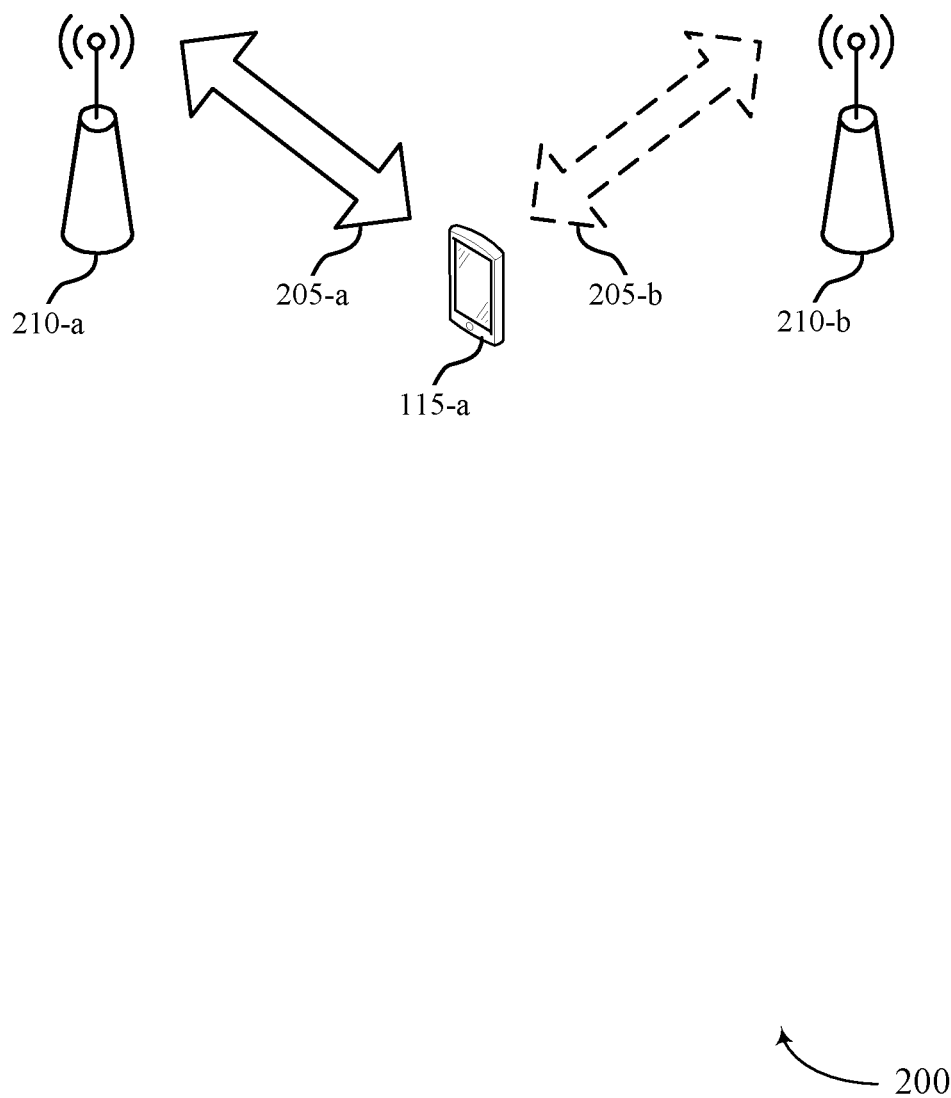
FIG. 2 illustrates an example of a wireless communication system that supports WUS selected cell indication for mobility in accordance with aspects of the present disclosure.

FIG. 2 illustrates an example of a wireless communication system 200 that supports WUS selected cell indication for mobility in accordance with aspects of the present disclosure. In some examples, wireless communication system 200 may implement aspects of wireless communication system 100. The wireless communication system 200 may include UE 115-*a*, which may be an example of a UE 115 described herein. UE 115-*a* may communicate with one or more TRPs 210, which may be examples of a base station 105, a serving cell, or a small cell as described herein.

UE 115-*a* may be configured with one or more cells to communicate with a wireless communications network. UE 115-*a* may receive an indication of a set of (e.g., one or more) PCIs and communicate with the network via one or more cells corresponding to the set of one or more PCIs. In some cases, the PCIs may be provided by a base station 105 or one or more TRPs 210. For example, a base station 105 may provide one or more cells for UE 115-*a*. Additionally, or alternatively, one or more TRPs 210 may be distributed in the wireless communication system 200 and may provide one or more cells for UE 115-*a*.

The wireless communication system 200 may support enhanced techniques for inter-cell mobility. For example, the wireless communication system 200 may support Layer 1 (L1) and/or Layer 2 (L2) based inter-cell mobility. In some examples, L1 may refer to the physical layer, and L2 may refer to the MAC, RLC, and PDCP layer.

In some cases, L1 and L2-based inter-cell mobility may include two modes. In a first mode of inter-cell mobility, a serving cell (e.g., each serving cell) may have multiple TRPs 210. In some cases, the TRPs 210 may be at different locations. In the first mode, each TRP 210 may have a different PCI. The PCI for a TRP 210 in the first mode may be carried by a synchronization signal block (SSB) transmitted by the TRP 210. A UE 115 may be served by a subset of the serving cell's PCIs. In some cases, the subset of serving PCIs may be changed via DCI or MAC CE information.

As an example of the first mode, UE 115-*a* may have one serving cell with multiple TRPs 210, such as TRP 210-*a* and TRP 210-*b*. TRP 210-*a* and TRP 210-*b* may provide the active PCIs for UE 115-*a*, which may be indicated to UE 115-*a* via DCI or a MAC CE. For example, TRP 210-*a* may be associated with a first PCI and provide link 205-*a* for UE 115-*a*, and TRP 210-*b* may be associated with a second PCI and provide link 205-*b* for UE 115-*a*. In some examples, TRP 210-*a* and TRP 210-*b* may be distributed to different locations within the wireless communications network 200, which may provide improved spatial diversity for UE 115-*a*. TRP 210-*a* and TRP 210-*b* may each transmit an SSB carrying a respective PCI. UE 115-*a* may receive the SSBs and identify the PCIs for TRP 210-*a* and TRP 210-*b*, respectively.

In a second mode, a UE 115 may be configured with a group of serving cells with a single PCI per serving cell. For example, the UE 115 may be configured with multiple serving cells, where each of the serving cells may have a different PCI. The UE 115 may be configured to measure L1 metrics for a serving cell (e.g., per serving cell) in the group. For example, the UE 115 may measure an L1 reference signal received power (RSRP), a signal plus interference to noise ratio (SINR), a reference signal received quality (RSRQ), or other L1 characteristic metrics, for each candidate serving cell. The UE 115 may be served by a subset of the group of serving cells at a time. In some cases, the subset may be changed by DCI or a MAC CE. A base station 105 (e.g., providing the serving cells) may determine the subset based on an L1 report from the UE 115. For example, the UE 115 may transmit the L1 report for the RSRP, SINR, RSRQ, etc., to a selected serving cell or to an anchor serving cell in the group.

As an example of the second mode, TRP 210-*a* may provide one or more serving cells for UE 115-*a*. For example, TRP 210-*a* may provide a serving cell with a first PCI to provide link 205-*a* for UE 115-*a*. In some cases, TRP 210-*a* may be an example of a base station 105. UE 115-*a* may perform measurements on the one or more serving cells provided by TRP 210-*a* and report the measurements to TRP 210-*a*. TRP 210-*a* may select a subset of the serving cells based on the report and configure the subset as active serving cells for UE 115-*a*. In some other examples, multiple TRPs 210 may provide the serving cells. For example, TRP 210-*a* may provide one or more serving cells, and TRP 210-*b* may provide one or more serving cells. In an example, TRP 210-*b* may provide a second serving cell with a second PCI to provide link 205-*b* for UE 115-*a*.

In some cases, UE 115-*a* may receive an indication of the subset of PCIs in a WUS. UE 115-*a* may monitor for a WUS in a designated occasion before a DRX on duration. The WUS may include one indicator per UE 115 to signal whether the UE 115 is to wake up for the next configured DRX on duration. As an example, UE 115-*a* may operate in a DRX off period. UE 115-*a* may monitor for a WUS during a designated occasion and detect the WUS. In some cases, the WUS may indicate a subset of active PCIs for UE 115-*a* from a larger set of candidate PCIs.

The techniques described herein provide various rules, procedures, actions, etc., that may be implemented in the context of a WUS, as well as other signaling options instead of a purely WUS based signaling. Examples of such techniques include, but are not limited to, the WUS indicating PCI(s) when the previous WUS indicates the UE 115-*a* is to remain in an idle state, a default configuration to be applied when the UE 115-*a* does not detect the WUS, the WUS conveying ACK/NACK resources use to confirm receipt of the WUS, the WUS indicating PCI(s) based on the offset between the WUS and the application time of the indicate PCI(s), using a DCI to indicate the PCI(s) during the on duration following the WUS, splitting the indication of the PCI(s) between the WUS and a downlink signal transmitted during the on duration following the WUS, and the like. More particular aspects of each technique is described with reference to FIGS. 3A through 3D and FIGS. 4A and 4*b*.

In some aspects, each of the one or more indicated PCI(s) may refer to an association with one or more TRPs (e.g., in the first mode) and/or with one or more serving cells in a group of candidate serving cells (e.g., in the second mode).

FIGS. 3A through 3D illustrate examples of a WUS configuration 300 that supports WUS selected cell indication for mobility in accordance with aspects of the present disclosure. In some examples, WUS configuration 300 may implement aspects of wireless communication systems 100 and/or 200. Aspects of WUS configuration 300 may be implemented by a UE and/or base station, which may be examples of the corresponding devices described herein. In some aspects, the base station may be associated with one or more cells, TRPs, and the like, with each device being associated with a corresponding PCI.

Figure 3A:
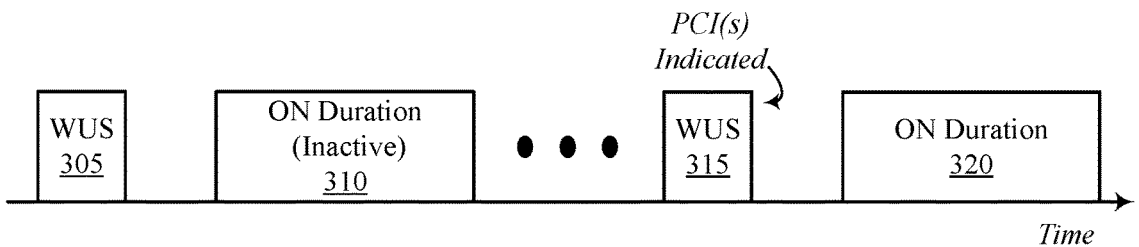
FIGS. 3A through 3D illustrate examples of a WUS configuration that supports WUS selected cell indication for mobility in accordance with aspects of the present disclosure.
Figure 3B:
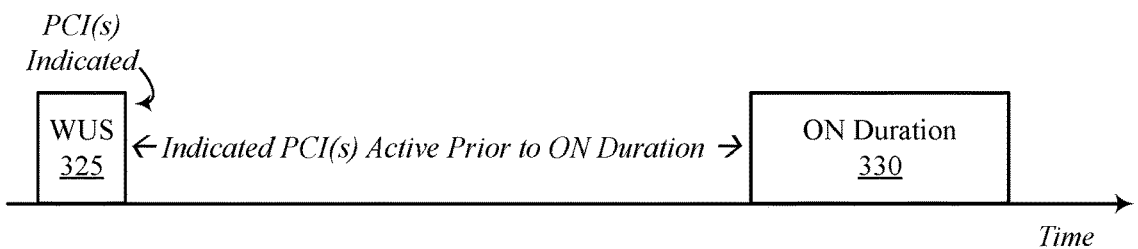
Figure 3C:
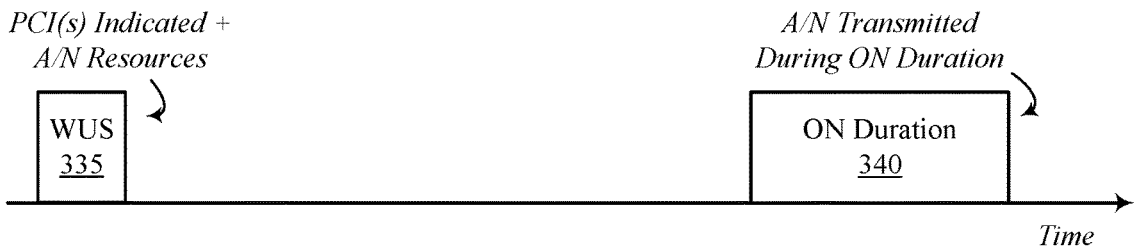
Figure 3D:
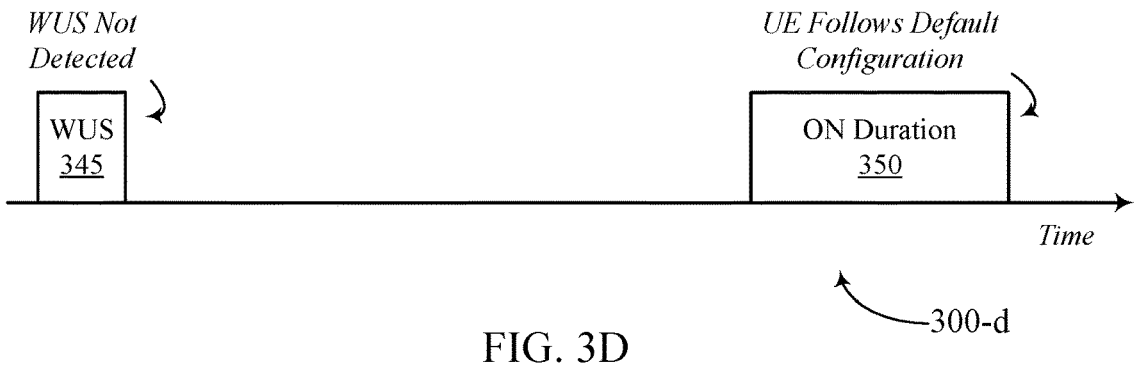

Broadly, WUS configuration 300-*a* of FIG. 3A illustrates an example where the WUS indicates PCI(s) when the previous WUS indicates the UE is to remain in an idle state. WUS configuration 300-*b* of FIG. 3B illustrates an example where a default configuration where the WUS indicating PCI(s) is based on the offset between the WUS and the application time of the indicate PCI(s). WUS configuration 300-*c* of FIG. 3C illustrates an example where the WUS conveys ACK/NACK resources for the UE to use to confirm receipt of the WUS. WUS configuration 300-*d* of FIG. 3D illustrates an example where a default configuration is defined for the UE to be applied when the UE does not detect the WUS.

Referring to WUS configuration 300-*a* of FIG. 3A, aspects of the described techniques include, when the WUS 305 indicates for the UE to remain in the inactive, sleep, or idle state during the on duration 310, then the WUS 315 before the on duration 320 can be used to indicate the PCI(s). That is, the WUS 315 may carry or otherwise indicate the PCI(s) per UE at least when the previous WUS (e.g., WUS 305) indicates no wakeup in the previous on duration (e.g., on duration 310). In some aspects, the UE may send a persistent/semi-persistent (P/SP) channel state information (CSI) report without monitoring the previous DRX on duration (e.g., without monitoring the on duration 310). That is, the UE may monitor serving cell(s), TRP(s), and the like, associated with the indicated PCI(s) to determine various channel conditions, e.g., reference signal received power (RSRP), signal-to-noise ratio (SNR), etc. The UE may then transmit its CSI report to the serving cell/TRP/base station(s) that transmitted its WUS(s) to indicate/update the candidate list of serving cell(s)/TRP(s)/base station(s).

For example, the UE may receive a first indication (e.g., in WUS 305) that the UE is to remain in an inactive state of the DRX cycle during the first on duration (e.g., during on duration 310). The UE may receive a second indication (e.g., in WUS 315) that the UE is to transition to an active state during a second on duration (e.g., during on duration 320). In response to the first indication indicating that the UE is to remain in the inactive state during on duration 310, the second indication may indicate or otherwise identify one or more PCIs for the UE to communicate with while in the active state (e.g., during on duration 320). The UE may identify the one or more PCIs from the second indication (e.g., from WUS 315).

In some aspects, the UE may also monitor for various reference signals associated with the one or more PCIs and transmit or otherwise convey a channel status report (e.g., the CSI report) based on the monitoring. For example, the UE may monitor one or more base stations/serving cells/TRPs, e.g., such as the base station/serving cell/TRP that transmitted the first and second indications (e.g., WUS 305 and WUS 315) to the UE.

In some aspects, the UE may switch to a new cell based on the indication of the one or more PCIs. For example, the UE may identify a serving cell associated with at least one of the one or more PCIs and perform a cell switching procedure to switch to that serving cell. As discussed above, references to a serving cell may include, but are not limited to, TRP(s) associated with the same serving cell and/or one or more serving cells in the group of candidate serving cells.

Referring to WUS configuration 300-*b* of FIG. 3B, aspects of the described techniques include the WUS 325 indicating PCI(s) based on the offset between the WUS 325 and the application time of the indicate PCI(s). That is, the WUS 325 may carry or otherwise indicate the PCI(s) per UE at least when the required minimum offset between the WUS 325 and the application time of the selected PCI(s) exceed a threshold. This may include the serving cell/TRP/base station determining when the available PCI(s) will be ready for communications with the UE (e.g., based on when the UE can switch to each PCI). The serving cell/TRP/base station may include the indicated PCI(s) based on the PCI being available for communications with the UE during the corresponding on duration.

For example, the UE may receive an indication that the UE is to transition to an active state during on duration 330. The indication may be received via WUS 325. The UE may identify one or more PCIs for the UE to communicate with during on duration 330 based on the indication. In some aspects, the one or more PCIs identified in the indication may be based on an activation period associated with a corresponding serving cell associated with the one or more PCIs. That is, the PCIs identified in the indication may be included based on the corresponding serving cell and/or UE being configured or otherwise available for communications during on duration 330, e.g., the minimum offset distance between WUS 325 and on duration 330. Accordingly, the UE may communicate with at least one of the serving cells associated with the one or more PCIs during on duration 330.

In some aspects, this may be based on the capabilities of the UE. For example, the UE may signal its UE capability, which may include an indication of the switching time of the UE. Based on the UE's switching time, the base station may only include PCIs in the indication that are going to be available during on duration 330. That is, based on the UE capability message, the base station may know how long it takes the UE to switch to a new serving cell. Provided that the switching time of the UE is less than the duration between WUS 325 and on duration 330, a corresponding PCI may be included in the indication.

In some aspects, the UE may switch to a new cell based on the indication of the one or more PCIs. For example, the UE may identify a serving cell associated with at least one of the one or more PCIs and perform a cell switching procedure to switch to that serving cell. As discussed above, references to a serving cell may include, but are not limited to, TRP(s) associated with the same serving cell and/or one or more serving cells in the group of candidate serving cells.

Although the described techniques above provide for WUS 325 conveying the indication of the one or more PCIs, in some examples the indication may be provided in a non-WUS DCI. That is, the indication of the one or more PCIs may be conveyed in a DCI transmitted during a previous on duration.

Referring to WUS configuration 300-c of FIG. 3C, aspects of the described techniques include the WUS 335 conveys ACK/NACK resources for the UE to use to confirm receipt of the WUS 335. That is, the WUS 335 carrying the selected PCI(s) per UE may be configured with ACK/NACK feedback resources. In some aspects, the ACK/NACK resources per UE may be configured either outside or inside the configured DRX on duration (e.g., outside or during on duration 340).

For example, the UE may receive an indication (e.g., in WUS 335) that the UE is to transition to an active state during on duration 340 and also identify one or more PCIs for the UE to communicate with. The UE may receive or otherwise identify a configuration of one or more resources for transmitting a feedback signal acknowledging that the UE was able to successfully decode the indication (e.g., WUS 335). Accordingly, the UE may transition to the active state during on duration 340 and transmit a feedback signal while in the active state and using one or more resources. However, it is to be understood that in some examples the UE may transmit the feedback signal during on duration 340 or after on duration 340. Broadly, the feedback signal may be an example of a HARQ ACK/NACK message.

In some aspects, the UE may switch to a new cell based on the indication of the one or more PCIs. For example, the UE may identify a serving cell associated with at least one of the one or more PCIs and perform a cell switching procedure to switch to that serving cell. As discussed above, references to a serving cell may include, but are not limited to, TRP(s) associated with the same serving cell and/or one or more serving cells in the group of candidate serving cells.

Referring to WUS configuration 300-d of FIG. 3D, aspects of the described techniques a default configuration being is defined for the UE to be applied when the UE does not detect the WUS 345. That is, the default UE behavior can be defined if WUS 345 is not detected, has a decoding error, or has no monitoring occasion associated with a configured DRX on duration (e.g., on duration 350). In one option, the default configuration or behavior may include the UE staying awake at least in the next configured DRX on duration (e.g., staying away for on duration 350). In another option, the default configuration or behavior may include the UE going to sleep (e.g., inactive) at least in the next configured DRX on duration (e.g., being inactive for on duration 350). In yet another option, the base station may dynamically indicate the default configuration (e.g., the base station may indicate which of the two options discussed above that the UE will follow). The base station may dynamically indicate the default configuration or behavior via any downlink signal, such as a DCI, MAC CE, RRC, etc.

For example, the UE may identify a default configuration associated with the UE failing to detect an indication (e.g., WUS 345) of whether the UE is to transition to an active state or remain in an inactive state during on duration 350. The UE may apply the default configuration during on duration 350 when WUS 345 is not detected. For example, the UE may transition to the active state during on duration 350, may remain in the active state until a monitoring occasion associated with detecting a second indication (e.g., a subsequent WUS), remain in the inactive state during on duration 350, and/or remain in the inactive state until a monitoring occasion associated with detecting a second indication (e.g., a subsequent WUS). As discussed above, the default configuration may be known by the UE and base station and/or may be signaled by the base station and a configuration signal (e.g., DCI, MAC CE, RRC signal, and the like).

Figure 4A:
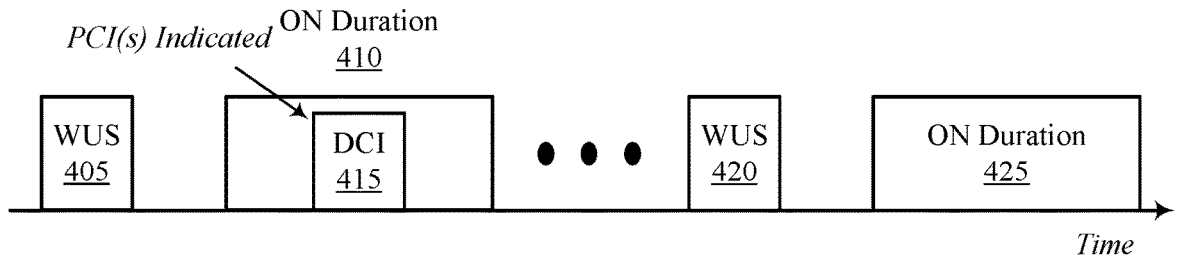
FIGS. 4A and 4B illustrate examples of a WUS configuration that supports WUS selected cell indication for mobility in accordance with aspects of the present disclosure.
Figure 4B:
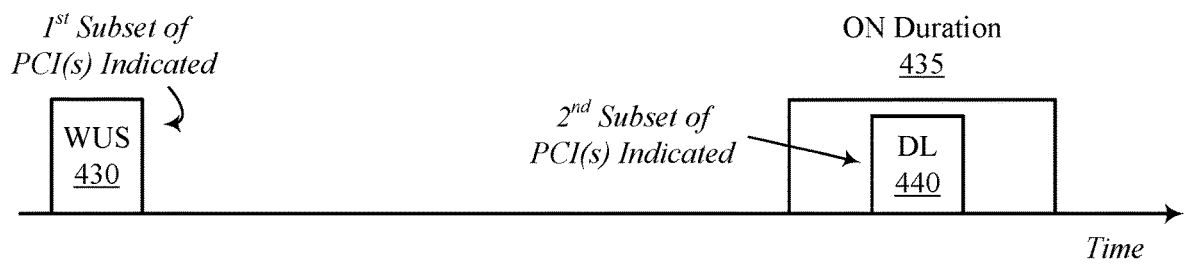

FIGS. 4A and 4B illustrate examples of a WUS configuration 400 that supports WUS selected cell indication for mobility in accordance with aspects of the present disclosure. In some examples, WUS configuration 400 may implement aspects of wireless communication systems 100 and/or 200, and/or WUS configuration 300. Aspects of WUS configuration 400 may be implemented by a UE and/or base station, which may be examples of the corresponding devices described herein. In some aspects, the base station may be associated with one or more cells, TRPs, and the like, with each device being associated with a corresponding PCI.

Broadly, WUS configuration 400-a of FIG. 4A illustrates an example where a DCI is used to indicate the PCI(s) during a previous on duration following the WUS. WUS configuration 400-b of FIG. 4B illustrates an example where the indication of the PCI(s) is split between the WUS and a downlink (DL) signal transmitted during the on duration following the WUS.

Referring to WUS configuration 400-a of FIG. 4A, aspects of the described techniques include a DCI 415 being used to indicate the PCI(s) during the on duration 410 following the WUS 405. That is, instead of WUS 405 indicating the PCI(s), a non-WUS DCI (e.g., DCI 415) can signal the selected subset of PCI(s). The selected PCI(s) per UE can be indicated by the DCI 415 in the previous on duration 410. The application period of the selected/indicated PCI(s) may have various options. One option may include the selected PCI(s) being applied to the next configured on duration (e.g., on duration 425 following WUS 420), or the next X consecutive on durations (where X is a positive integer). Another option may include the selected PCI(s) being applied to all of the following DRX on durations until the PCI(s) are updated (e.g., via another WUS or non-WUS DCI). Yet another option may include the applicable DRX on durations being configured/indicated by the base station, e.g., the $2^{nd}$ to $5^{th}$ on durations after the previous DRX on duration (e.g., after on duration 410) where the selected PCI(s) are indicated by DCI 415.

For example, the UE may receive a downlink grant (e.g., a DCI grant) identifying one or more PCIs for the UE to communicate. The UE may receive the downlink grant while in an active state and during on duration 410. Subsequently, the UE may receive an indication (e.g., WUS 420) that the UE is to transition to an active state during a second on duration (e.g., during on duration 425). Accordingly, the UE may transition to the active state during on duration 425 according to the indication. In some aspects, the UE may communicate with one or more serving cells associated with the one or more PCIs based on the indication.

In some aspects, the base station and/or UE may identify an application window for the one or more PCIs. Examples of the application window include, but are not limited to, a next on duration (e.g., on duration 425), a set of subsequent on duration(s) following on duration 410, and/or entail an indication being received updating the one or more PCIs (e.g., in a subsequent WUS and/or non-WUS DCI). In some aspects, DCI 415 may identify or otherwise indicate the application window for the one or more PCIs.

In some aspects, the UE may switch to a new cell based on the indication of the one or more PCIs. For example, the UE may identify a serving cell associated with at least one of the one or more PCIs and perform a cell switching procedure to switch to that serving cell. As discussed above, references to a serving cell may include, but are not limited to, TRP(s) associated with the same serving cell and/or one or more serving cells in the group of candidate serving cells.

Referring to WUS configuration 400-b of FIG. 4B, aspects of the described techniques include the indication of the PCI(s) being split between the WUS 430 and a downlink signal 440 transmitted during the on duration 435 following the WUS 430, e.g., sequential signaling of the subset of PCI(s). That is, WUS 430 may indicate a part of the selected PCI(s) (e.g., a first subset) to reduce signaling overhead in the WUS 430. Once the UE is awake in the next on duration (e.g., on duration 435), the remaining part of the selected PCI(s) (e.g., a second subset) can be further signaled to the UE (e.g., in a downlink signal 440, such as a DCI, MAC CE, RRC, etc.). In some aspects, the signaling of the remaining part of the selected PCI(s) may also be based on UE triggering. For example, the UE may send a trigger (e.g., a confirmation signal) to indicate that the UE has switched to the first part of the selected PCI(s) indicated in WUS 430. The base station may then signal the remaining part of the selected PCI(s) (e.g., the second subset) over the first part of the selected PCI(s) e.g., via base station(s), cell(s), TRP(s), etc., associated with the first subset of PCI(s) indicated in WUS 430.

For example, the UE may receive an indication (e.g., in WUS 430) that the UE is to transition to an active state during on duration 435. Based on the indication (e.g., based on WUS 430), the UE may identify a first subset of one or more PCIs for the UE to communicate with. The UE may transition to the active state during on duration 435 according to the indication and receive, while in the active state, downlink signal 440 identifying a second subset of one or more PCIs for the UE to communicate with.

In some aspects, the UE may transmit a confirmation that the UE has switched to serving cells associated with the first subset of the one or PCIs. In this aspect, the indication of the second subset of PCIs conveyed in the downlink signal 440 may be based on the base station receiving confirmation from the UE. However, the described techniques are not limited to this example and, instead, the base station may transmit the downlink signal 440 conveying the indication of the second subset of one or more PCIs regardless of whether or not it received confirmation from the UE.

In some aspects, the UE may receive the downlink signal 440 from at least one PCI of the first subset of one or more PCIs. That is, the UE may identify a serving cell associated with at least one of the first subset of one or more PCIs, switch to that serving cell, and then that serving cell may transmit the downlink signal 440.

Figure 5:
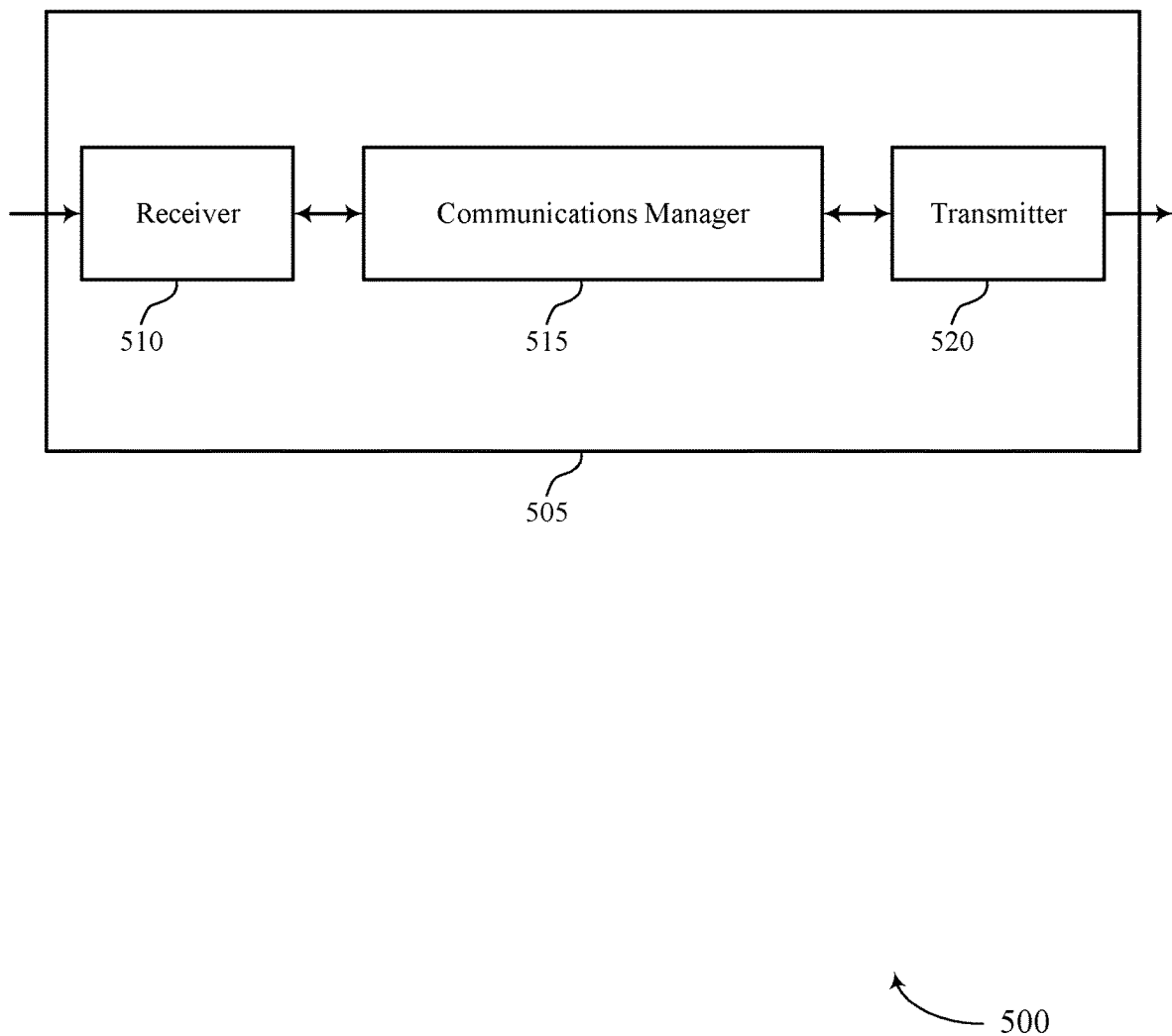
FIGS. 5 and 6 show block diagrams of devices that support WUS selected cell indication for mobility in accordance with aspects of the present disclosure.

FIG. 5 shows a block diagram 500 of a device 505 that supports WUS selected cell indication for mobility in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to WUS selected cell indication for mobility, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, prior to a first on duration of a DRX cycle, a first indication that the UE is to remain in an inactive state of the DRX cycle during the first on duration, receive, prior to a second on duration of the DRX cycle, a second indication that the UE is to transition to an active state during the second on duration, where the second indication indicates, based on the first indication indicating that the UE is to remain in the inactive state during the first on duration, and one or more PCIs for the UE to communicate with while in the active state, and identify the one or more PCIs indicated in the second indication.

The communications manager 515 may also receive, prior to an on duration of a DRX cycle, an indication that the UE is to transition to an active state during the on duration, identify, based on the indication, one or more PCIs for the UE to communicate with during the on duration, the one or more PCIs being indicated based on an activation period associated with a corresponding serving cell associated with the one or more PCIs, and communicate with at least one serving cell associated with the one or more PCIs during the on duration.

The communications manager 515 may also receive, prior to an on duration of a DRX cycle, an indication that the UE is to transition to an active state during the on duration and one or more PCIs for the UE to communicate with, receive a configuration, based on the indication, of one or more resources for transmitting a feedback signal acknowledging that the UE was able to successfully decode the indication, transition to the active state during the on duration based on the indication, and transmit the feedback signal while in the active state and using the one or more resources.

The communications manager 515 may also identify a default configuration associated with failing to detect an indication of whether the UE is to transition to an active state or remain in an inactive state during an on duration of a DRX cycle during a corresponding monitoring period and apply, based at least in response to failing to detect the indication, the default configuration during the on duration.

The communications manager 515 may also receive, while in an active state and during a first on duration of a DRX cycle, a downlink grant identifying one or more PCIs for the UE to communicate with, transition to the active state during the second on duration according to the indication, and receive, prior to a second on duration of the DRX cycle, an indication that the UE is to transition to an active state of the DRX cycle during the second on duration.

The communications manager 515 may also receive, prior to an on duration of a DRX cycle, an indication that the UE is to transition to an active state of a DRX cycle during the on duration, identify, based on the indication, a first subset of one or more PCIs for the UE to communicate with, receive, while in the active state, a downlink signal identifying a second subset of one or more PCIs for the UE to communicate with, and transition to the active state during the on duration according to the indication.

The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver. For example, the transmitter 520 may be an example of aspects of the transceiver 820 described with reference to FIG. 8. The transmitter 520 may utilize a single antenna or a set of antennas.

Figure 6:
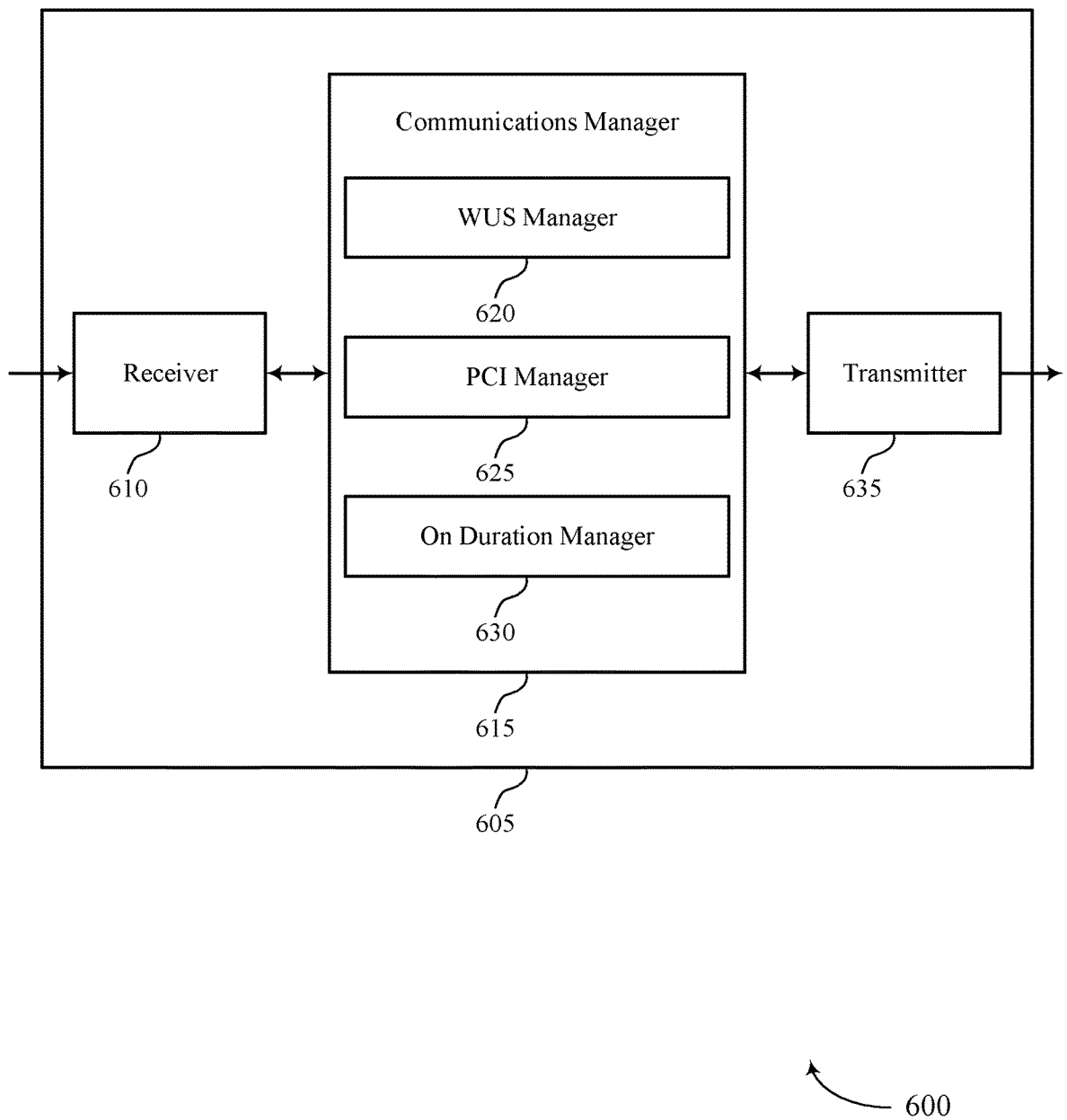

FIG. 6 shows a block diagram 600 of a device 605 that supports WUS selected cell indication for mobility in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to WUS selected cell indication for mobility, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a WUS manager 620, a PCI manager 625, and an on duration manager 630. The communications manager 615 may be an example of aspects of the communications manager 810 described herein.

The WUS manager 620 may receive, prior to a first on duration of a DRX cycle, a first indication that the UE is to remain in an inactive state of the DRX cycle during the first on duration and receive, prior to a second on duration of the DRX cycle, a second indication that the UE is to transition to an active state during the second on duration, where the second indication indicates, based on the first indication indicating that the UE is to remain in the inactive state during the first on duration, and one or more PCIs for the UE to communicate with while in the active state.

The PCI manager 625 may identify the one or more PCIs indicated in the second indication.

The WUS manager 620 may receive, prior to an on duration of a DRX cycle, an indication that the UE is to transition to an active state during the on duration.

The PCI manager 625 may identify, based on the indication, one or more PCIs for the UE to communicate with during the on duration, the one or more PCIs being indicated based on an activation period associated with a corresponding serving cell associated with the one or more PCIs and communicate with at least one serving cell associated with the one or more PCIs during the on duration.

The WUS manager 620 may receive, prior to an on duration of a DRX cycle, an indication that the UE is to transition to an active state during the on duration and one or more PCIs for the UE to communicate with and receive a configuration, based on the indication, of one or more resources for transmitting a feedback signal acknowledging that the UE was able to successfully decode the indication.

The on duration manager 630 may transition to the active state during the on duration based on the indication.

The PCI manager 625 may transmit the feedback signal while in the active state and using the one or more resources.

The WUS manager 620 may identify a default configuration associated with failing to detect an indication of whether the UE is to transition to an active state or remain in an inactive state during an on duration of a DRX cycle during a corresponding monitoring period and apply, based at least in response to failing to detect the indication, the default configuration during the on duration.

The on duration manager 630 may receive, while in an active state and during a first on duration of a DRX cycle, a downlink grant identifying one or more PCIs for the UE to communicate with and transition to the active state during the second on duration according to the indication.

The WUS manager 620 may receive, prior to a second on duration of the DRX cycle, an indication that the UE is to transition to an active state of the DRX cycle during the second on duration. The WUS manager 620 may receive, prior to an on duration of a DRX cycle, an indication that the UE is to transition to an active state of a DRX cycle during the on duration.

The PCI manager 625 may identify, based on the indication, a first subset of one or more PCIs for the UE to communicate with and receive, while in the active state, a downlink signal identifying a second subset of one or more PCIs for the UE to communicate with.

The on duration manager 630 may transition to the active state during the on duration according to the indication.

The transmitter 635 may transmit signals generated by other components of the device 605. In some examples, the transmitter 635 may be collocated with a receiver 610 in a transceiver. For example, the transmitter 635 may be an example of aspects of the transceiver 820 described with reference to FIG. 8. The transmitter 635 may utilize a single antenna or a set of antennas.

Figure 7:
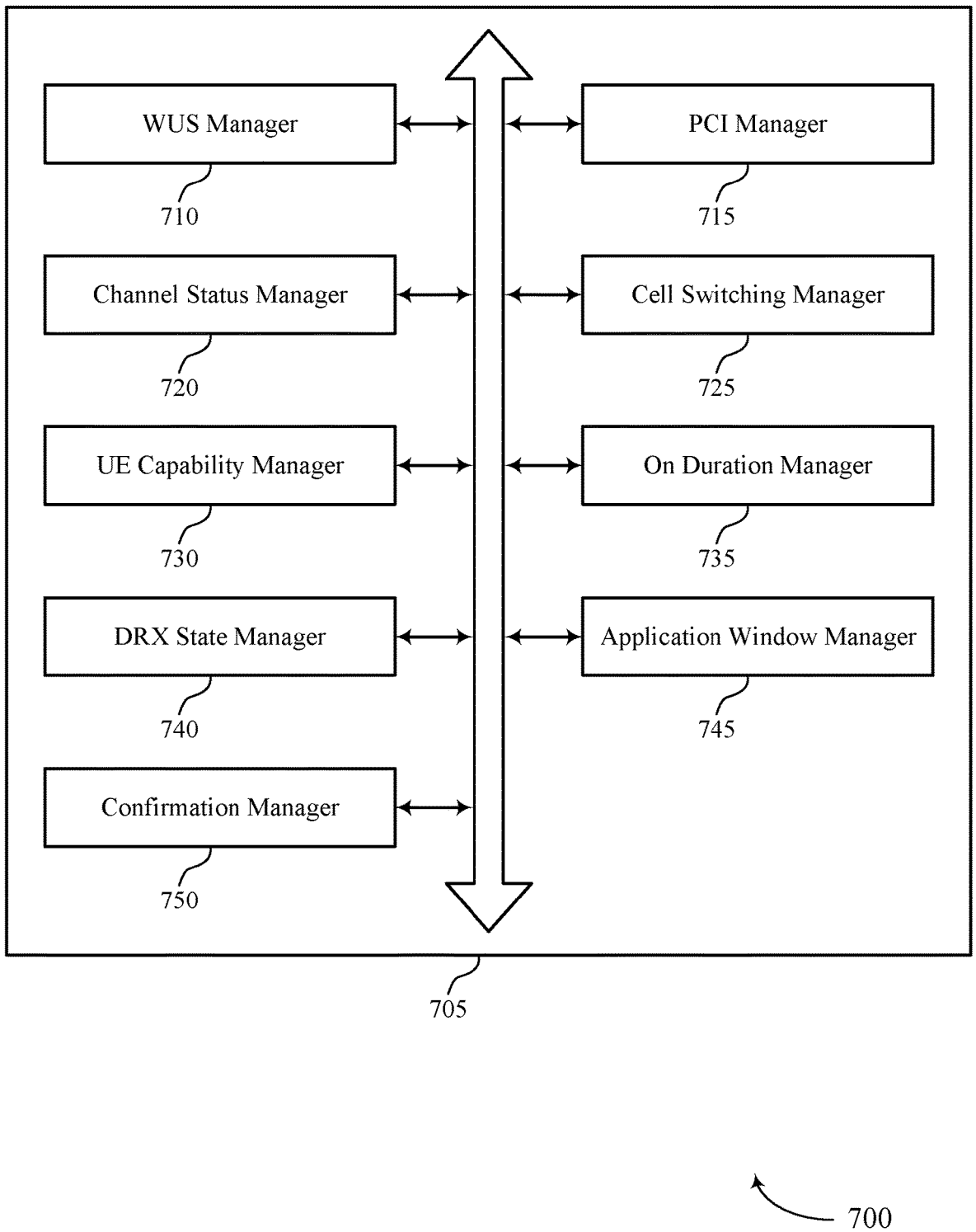
FIG. 7 shows a block diagram of a communications manager that supports WUS selected cell indication for mobility in accordance with aspects of the present disclosure.

FIG. 7 shows a block diagram 700 of a communications manager 705 that supports WUS selected cell indication for mobility in accordance with aspects of the present disclosure. The communications manager 705 may be an example of aspects of a communications manager 515, a communications manager 615, or a communications manager 810 described herein. The communications manager 705 may include a WUS manager 710, a PCI manager 715, a channel status manager 720, a cell switching manager 725, an UE capability manager 730, an on duration manager 735, a DRX state manager 740, an application window manager 745, and a confirmation manager 750. Each of these components may communicate, directly or indirectly, with one another (e.g., via one or more buses).

The WUS manager 710 may receive, prior to a first on duration of a DRX cycle, a first indication that the UE is to remain in an inactive state of the DRX cycle during the first on duration. In some examples, the WUS manager 710 may receive, prior to a second on duration of the DRX cycle, a second indication that the UE is to transition to an active state during the second on duration, where the second indication indicates, based on the first indication indicating that the UE is to remain in the inactive state during the first on duration, and one or more PCIs for the UE to communicate with while in the active state.

In some examples, the WUS manager 710 may receive, prior to an on duration of a DRX cycle, an indication that the UE is to transition to an active state during the on duration. In some examples, the WUS manager 710 may receive, prior to an on duration of a DRX cycle, an indication that the UE is to transition to an active state during the on duration and one or more PCIs for the UE to communicate with. In some examples, the WUS manager 710 may receive a configuration, based on the indication, of one or more resources for transmitting a feedback signal acknowledging that the UE was able to successfully decode the indication. In some examples, the WUS manager 710 may identify a default configuration associated with failing to detect an indication of whether the UE is to transition to an active state or remain in an inactive state during an on duration of a DRX cycle during a corresponding monitoring period.

In some examples, the WUS manager 710 may apply, based at least in response to failing to detect the indication, the default configuration during the on duration. In some examples, the WUS manager 710 may receive, prior to a second on duration of the DRX cycle, an indication that the UE is to transition to an active state of the DRX cycle during the second on duration. In some examples, the WUS manager 710 may receive, prior to an on duration of a DRX cycle, an indication that the UE is to transition to an active state of a DRX cycle during the on duration. In some examples, the WUS manager 710 may receive a configuration signal indicating the default configuration. In some cases, the first indication is received in a first WUS and the second indication is received in a second WUS. In some cases, the indication is received in at least one of a WUS or a non-WUS DCI. In some cases, the indication is received in a WUS. In some cases, the configuration signal includes at least one of a DCI, or a MAC CE, or a RRC signal, or a combination thereof. In some cases, the indication is received in a WUS and the downlink grant includes a DCI.

The PCI manager 715 may identify the one or more PCIs indicated in the second indication. In some examples, the PCI manager 715 may identify, based on the indication, one or more PCIs for the UE to communicate with during the on duration, the one or more PCIs being indicated based on an activation period associated with a corresponding serving cell associated with the one or more PCIs. In some examples, the PCI manager 715 may communicate with at least one serving cell associated with the one or more PCIs during the on duration. In some examples, the PCI manager 715 may transmit the feedback signal while in the active state and using the one or more resources.

In some examples, the PCI manager 715 may identify, based on the indication, a first subset of one or more PCIs for the UE to communicate with. In some examples, the PCI manager 715 may receive, while in the active state, a downlink signal identifying a second subset of one or more PCIs for the UE to communicate with. In some cases, the feedback signal includes a HARQ ACK/NACK message. In some cases, the downlink signal includes at least one of a DCI, or a MAC CE, or a RRC signal, or a combination thereof.

The on duration manager 735 may transition to the active state during the on duration based on the indication. In some examples, the on duration manager 735 may receive, while in an active state and during a first on duration of a DRX cycle, a downlink grant identifying one or more PCIs for the UE to communicate with. In some examples, the on duration manager 735 may transition to the active state during the second on duration according to the indication. In some examples, the on duration manager 735 may transition to the active state during the on duration according to the indication. In some cases, the feedback signal is transmitted during the on duration or after the on duration.

The channel status manager 720 may monitor reference signals, during the first on duration, associated with the identified one or more PCIs. In some examples, the channel status manager 720 may transmit, during the first on duration, a channel status report based on the monitoring. In some cases, the channel status report is transmitted to a base station associated with the first indication and the second indication.

The cell switching manager 725 may perform a cell switching procedure with a serving cell associated with at least one of the identified one or more PCIs. In some examples, the cell switching manager 725 may perform a cell switching procedure with a serving cell associated with at least one of the identified one or more PCIs. In some examples, the cell switching manager 725 may perform a cell switching procedure with a serving cell associated with at least one of the one or more PCIs. In some examples, the cell switching manager 725 may perform a cell switching procedure with a serving cell associated with at least one of the identified one or more PCIs. In some cases, the serving cell includes at least one of one or more transmission reception points of a same serving cell or one or more serving cells in a group of candidate serving cells.

The UE capability manager 730 may transmit a UE capability message indicating a cell switching time of the UE to switch to a new serving cell, where the one or more PCIs are included in the indication based on the cell switching time of the UE and the activation period of each corresponding serving cell.

The DRX state manager 740 may transition to the active state during the on duration based on failing to detect the indication. In some examples, the DRX state manager 740 may remain in the active state until a monitoring occasion associated with detecting a second indication. In some examples, the DRX state manager 740 may remain in the inactive state during the on duration based on failing to detect the indication. In some examples, the DRX state manager 740 may remain in the inactive state until a monitoring occasion associated with detecting a second indication.

The application window manager 745 may identify an application window for the one or more PCIs. In some examples, the application window manager 745 may communicate with the one or more PCIs based on the application window. In some cases, the application window includes at least one of a next on duration of the DRX cycle, or a set of subsequent one or more on durations of the DRX cycle following the on duration in which the downlink grant was received, or until an indication is received updating the one or more PCIs. In some cases, the downlink grant indicates the application window for the one or more PCIs.

The confirmation manager 750 may transmit, during an initial portion of the on duration, a confirmation that the UE has switched to serving cells associated with the first subset of the one or more PCIs, where the downlink signal is received in response to transmitting the confirmation. In some cases, the downlink signal is received from at least one physical cell identifier of the first subset of the one or more PCIs.

Figure 8:
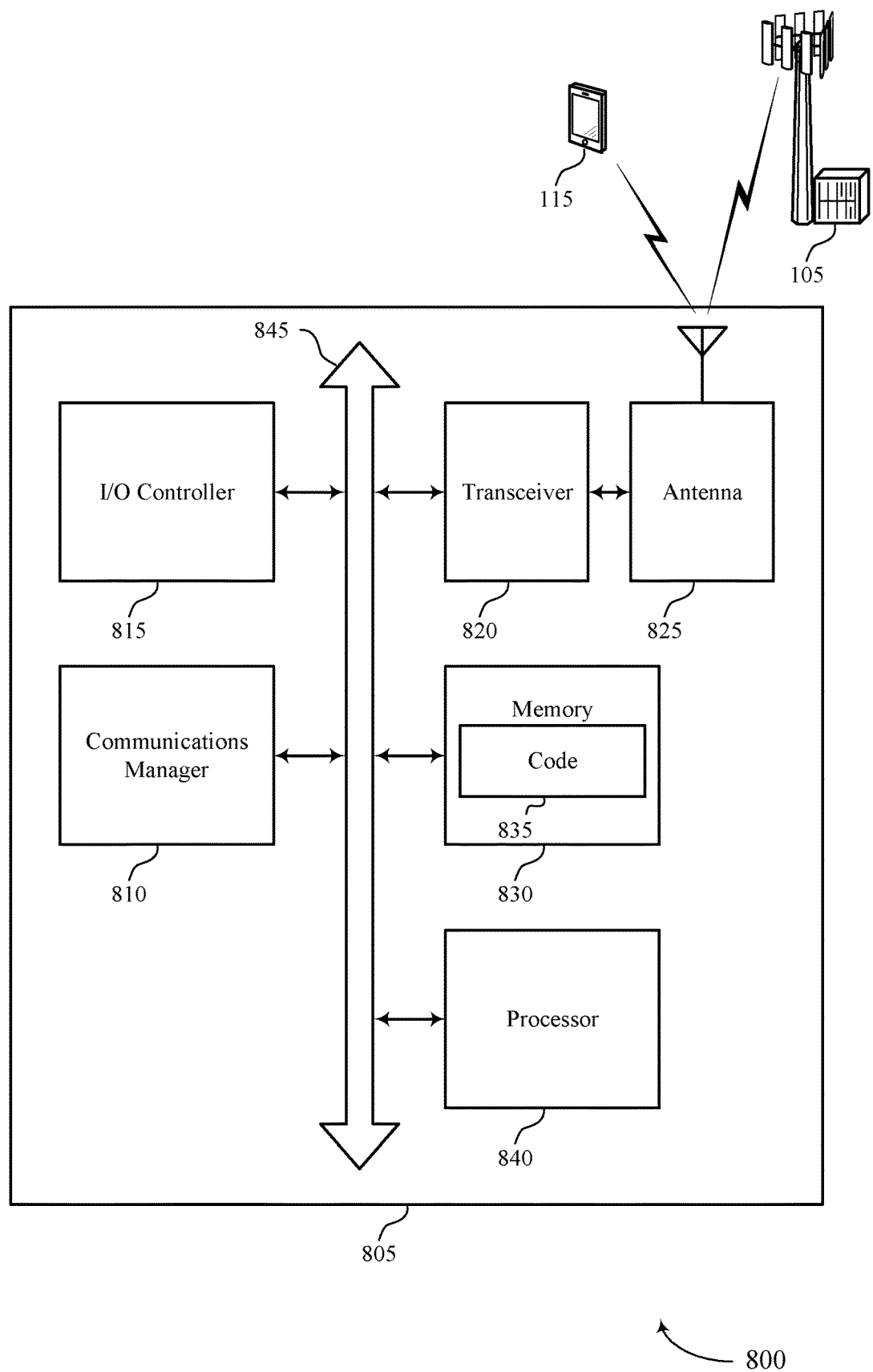
FIG. 8 shows a diagram of a system including a device that supports WUS selected cell indication for mobility in accordance with aspects of the present disclosure.

FIG. 8 shows a diagram of a system 800 including a device 805 that supports WUS selected cell indication for mobility in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, prior to a first on duration of a DRX cycle, a first indication that the UE is to remain in an inactive state of the DRX cycle during the first on duration, receive, prior to a second on duration of the DRX cycle, a second indication that the UE is to transition to an active state during the second on duration, where the second indication indicates, based on the first indication indicating that the UE is to remain in the inactive state during the first on duration, and one or more PCIs for the UE to communicate with while in the active state, and identify the one or more PCIs indicated in the second indication.

The communications manager 810 may also receive, prior to an on duration of a DRX cycle, an indication that the UE is to transition to an active state during the on duration, identify, based on the indication, one or more PCIs for the UE to communicate with during the on duration, the one or more PCIs being indicated based on an activation period associated with a corresponding serving cell associated with the one or more PCIs, and communicate with at least one serving cell associated with the one or more PCIs during the on duration.

The communications manager 810 may also receive, prior to an on duration of a DRX cycle, an indication that the UE is to transition to an active state during the on duration and one or more PCIs for the UE to communicate with, receive a configuration, based on the indication, of one or more resources for transmitting a feedback signal acknowledging that the UE was able to successfully decode the indication, transition to the active state during the on duration based on the indication, and transmit the feedback signal while in the active state and using the one or more resources.

The communications manager 810 may also identify a default configuration associated with failing to detect an indication of whether the UE is to transition to an active state or remain in an inactive state during an on duration of a DRX cycle during a corresponding monitoring period and apply, based at least in response to failing to detect the indication, the default configuration during the on duration.

The communications manager 810 may also receive, while in an active state and during a first on duration of a DRX cycle, a downlink grant identifying one or more PCIs for the UE to communicate with, transition to the active state during the second on duration according to the indication, and receive, prior to a second on duration of the DRX cycle, an indication that the UE is to transition to an active state of the DRX cycle during the second on duration.

The communications manager 810 may also receive, prior to an on duration of a DRX cycle, an indication that the UE is to transition to an active state of a DRX cycle during the on duration, identify, based on the indication, a first subset of one or more PCIs for the UE to communicate with, receive, while in the active state, a downlink signal identifying a second subset of one or more PCIs for the UE to communicate with, and transition to the active state during the on duration according to the indication.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting WUS selected cell indication for mobility).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
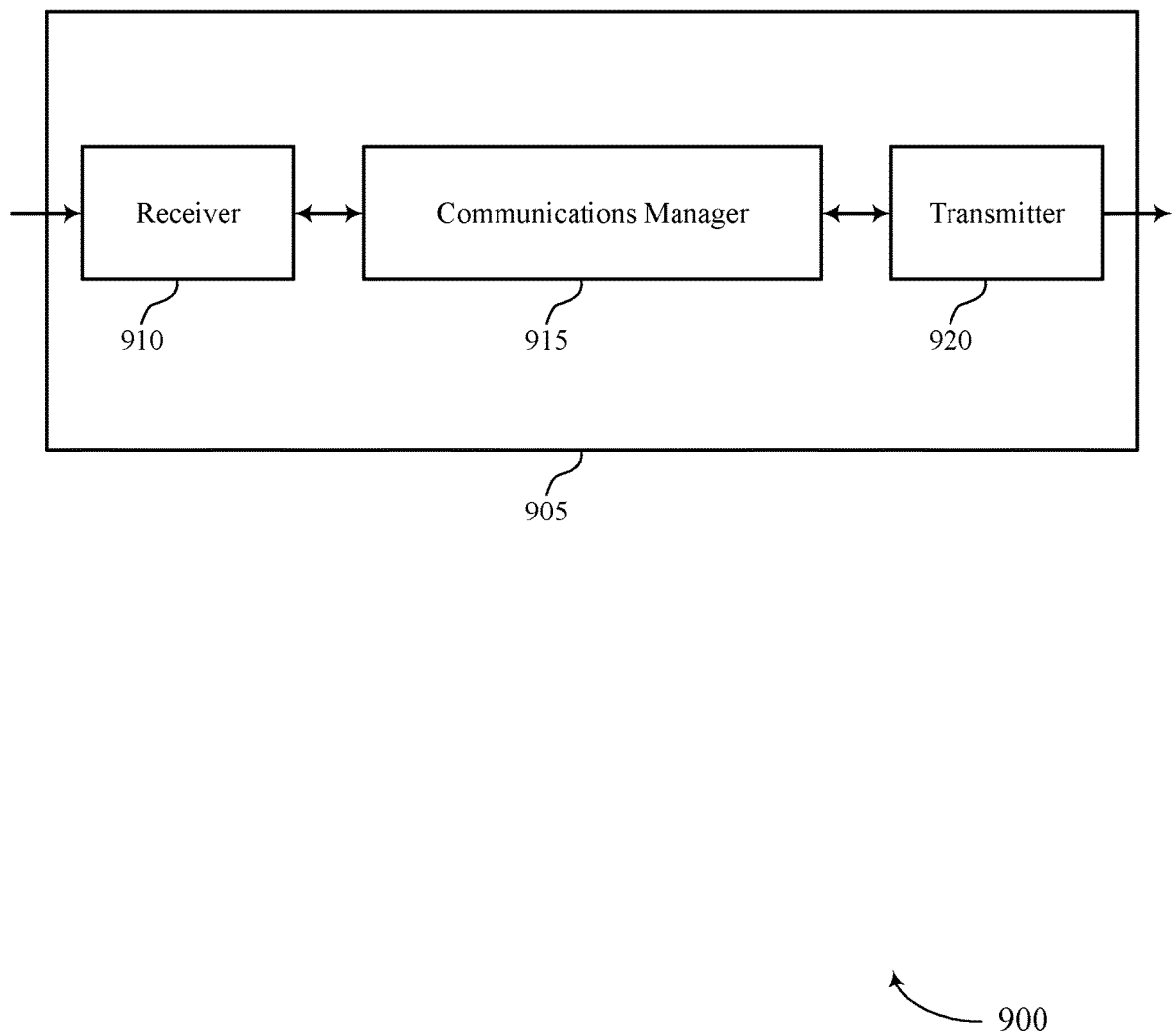
FIGS. 9 and 10 show block diagrams of devices that support WUS selected cell indication for mobility in accordance with aspects of the present disclosure.

FIG. 9 shows a block diagram 900 of a device 905 that supports WUS selected cell indication for mobility in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to WUS selected cell indication for mobility, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE and prior to a first on duration of a DRX cycle, a first indication that the UE is to remain in an inactive state of the DRX cycle during the first on duration, transmit, prior to a second on duration of the DRX cycle, a second indication that the UE is to transition to an active state during the second on duration, where the second indication indicates, based on the first indication indicating that the UE is to remain in the inactive state during the first on duration, and the one or more PCIs for the UE to communicate with while in the active state, and determine one or more PCIs for the UE to communicate with.

The communications manager 915 may also identify, for a UE and based on an activation period of a serving cell, one or more PCIs available for the UE to communicate with and transmit, prior to an on duration of a DRX cycle of the UE, an indication that the UE is to transition to an active state during the on duration and identifying the one or more PCIs.

The communications manager 915 may also determine one or more resources for a UE to use for transmitting a feedback signal, transmit, prior to an on duration of a DRX cycle, an indication that the UE is to transition to an active state during the on duration, identifying one or more PCIs for the UE to communicate with, and identifying the one or more resources, and receive the feedback signal over the one or more resources, the feedback signal acknowledging that the UE was able to successfully decode the indication.

The communications manager 915 may also identify, for a UE, a default configuration associated with the UE failing to detect an indication of whether the UE is to transition to an active state or remain in an inactive state during an on duration of a DRX cycle during a corresponding monitoring period and transmit a configuration signal to the UE indicating the default configuration.

The communications manager 915 may also transmit, to a UE and while the UE is in an active state during a first on duration of a DRX cycle, a downlink grant identifying one or more PCIs for the UE to communicate with and transmit, prior to a second on duration of the DRX cycle, an indication that the UE is to transition to an active state of the DRX cycle during the second on duration.

The communications manager 915 may also transmit, to a UE and prior to an on duration of a DRX cycle, an indication that the UE is to transition to an active state of a DRX cycle during the on duration, the indication identifying a first subset of one or more PCIs for the UE to communicate with and transmit, during the on duration, a downlink signal identifying a second subset of one or more PCIs for the UE to communicate with.

The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver. For example, the transmitter 920 may be an example of aspects of the transceiver 1220 described with reference to FIG. 12. The transmitter 920 may utilize a single antenna or a set of antennas.

Figure 10:
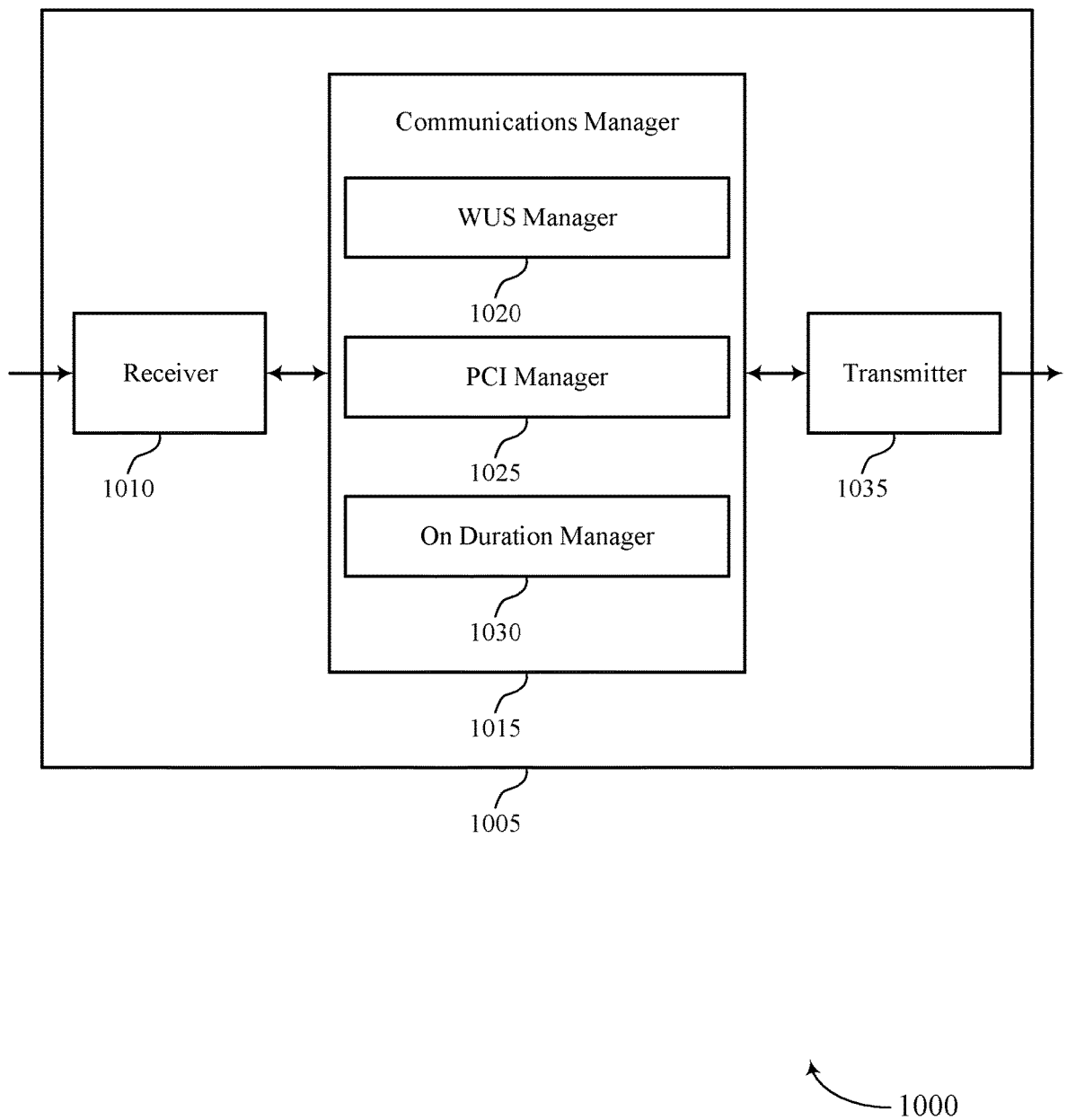

FIG. 10 shows a block diagram 1000 of a device 1005 that supports WUS selected cell indication for mobility in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to WUS selected cell indication for mobility, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a WUS manager 1020, a PCI manager 1025, and an on duration manager 1030. The communications manager 1015 may be an example of aspects of the communications manager 1210 described herein.

The WUS manager 1020 may transmit, to a UE and prior to a first on duration of a DRX cycle, a first indication that the UE is to remain in an inactive state of the DRX cycle during the first on duration and transmit, prior to a second on duration of the DRX cycle, a second indication that the UE is to transition to an active state during the second on duration, where the second indication indicates, based on the first indication indicating that the UE is to remain in the inactive state during the first on duration, and the one or more PCIs for the UE to communicate with while in the active state.

The PCI manager 1025 may determine one or more PCIs for the UE to communicate with. The PCI manager 1025 may identify, for a UE and based on an activation period of a serving cell, one or more PCIs available for the UE to communicate with.

The WUS manager 1020 may transmit, prior to an on duration of a DRX cycle of the UE, an indication that the UE is to transition to an active state during the on duration and identifying the one or more PCIs. The WUS manager 1020 may determine one or more resources for a UE to use for transmitting a feedback signal and transmit, prior to an on duration of a DRX cycle, an indication that the UE is to transition to an active state during the on duration, identifying one or more PCIs for the UE to communicate with, and identifying the one or more resources.

The on duration manager 1030 may receive the feedback signal over the one or more resources, the feedback signal acknowledging that the UE was able to successfully decode the indication.

The WUS manager 1020 may identify, for a UE, a default configuration associated with the UE failing to detect an indication of whether the UE is to transition to an active state or remain in an inactive state during an on duration of a DRX cycle during a corresponding monitoring period and transmit a configuration signal to the UE indicating the default configuration.

The on duration manager 1030 may transmit, to a UE and while the UE is in an active state during a first on duration of a DRX cycle, a downlink grant identifying one or more PCIs for the UE to communicate with.

The WUS manager 1020 may transmit, prior to a second on duration of the DRX cycle, an indication that the UE is to transition to an active state of the DRX cycle during the second on duration.

The WUS manager 1020 may transmit, to a UE and prior to an on duration of a DRX cycle, an indication that the UE is to transition to an active state of a DRX cycle during the on duration, the indication identifying a first subset of one or more PCIs for the UE to communicate with.

The on duration manager 1030 may transmit, during the on duration, a downlink signal identifying a second subset of one or more PCIs for the UE to communicate with.

The transmitter 1035 may transmit signals generated by other components of the device 1005. In some examples, the transmitter 1035 may be collocated with a receiver 1010 in a transceiver. For example, the transmitter 1035 may be an example of aspects of the transceiver 1220 described with reference to FIG. 12. The transmitter 1035 may utilize a single antenna or a set of antennas.

Figure 11:
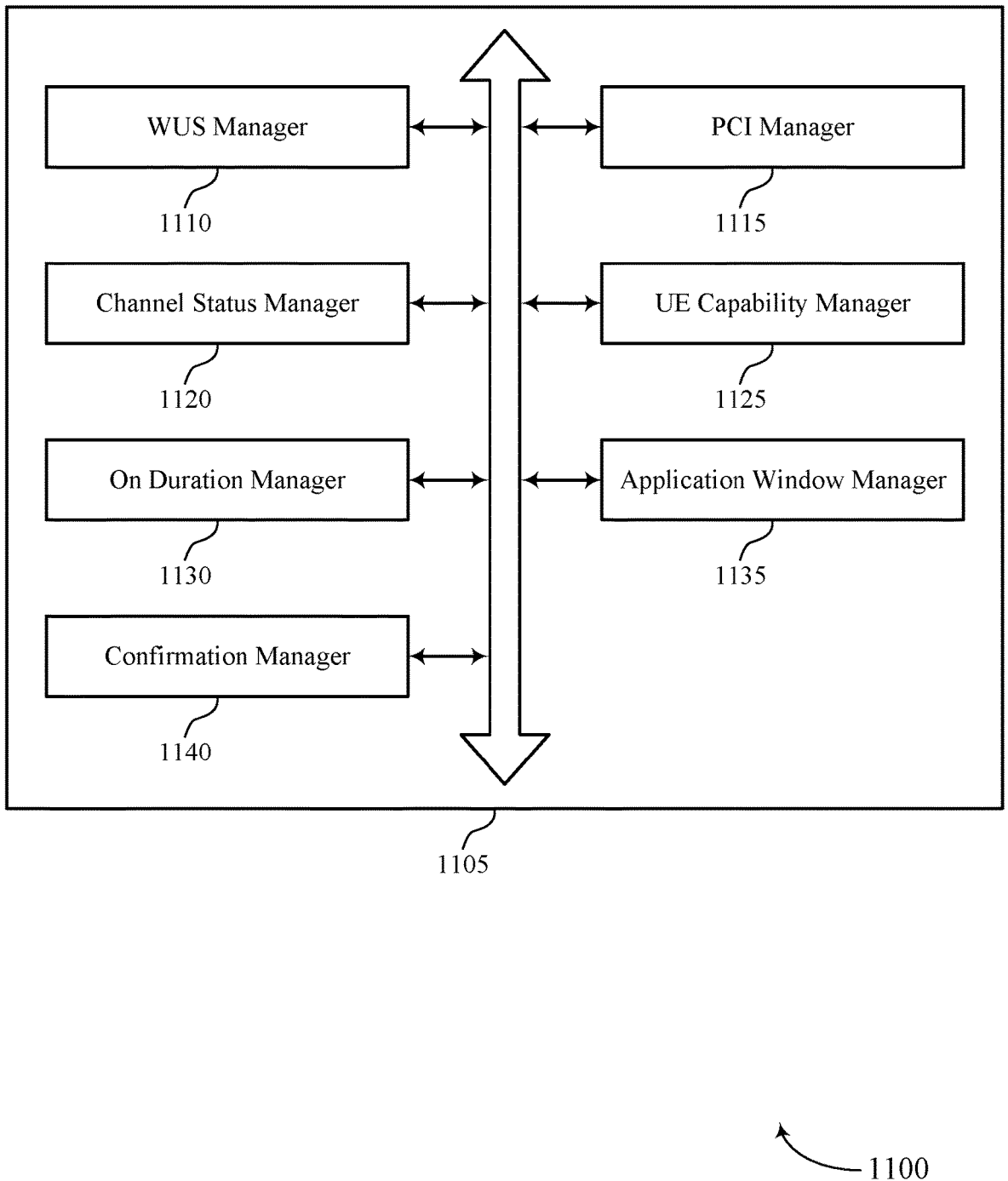
FIG. 11 shows a block diagram of a communications manager that supports WUS selected cell indication for mobility in accordance with aspects of the present disclosure.

FIG. 11 shows a block diagram 1100 of a communications manager 1105 that supports WUS selected cell indication for mobility in accordance with aspects of the present disclosure. The communications manager 1105 may be an example of aspects of a communications manager 915, a communications manager 1015, or a communications manager 1210 described herein. The communications manager 1105 may include a WUS manager 1110, a PCI manager 1115, a channel status manager 1120, an UE capability manager 1125, an on duration manager 1130, an application window manager 1135, and a confirmation manager 1140. Each of these components may communicate, directly or indirectly, with one another (e.g., via one or more buses).

The WUS manager 1110 may transmit, to a UE and prior to a first on duration of a DRX cycle, a first indication that the UE is to remain in an inactive state of the DRX cycle during the first on duration.

In some examples, the WUS manager 1110 may transmit, prior to a second on duration of the DRX cycle, a second indication that the UE is to transition to an active state during the second on duration, where the second indication indicates, based on the first indication indicating that the UE is to remain in the inactive state during the first on duration, and the one or more PCIs for the UE to communicate with while in the active state. In some examples, the WUS manager 1110 may transmit, prior to an on duration of a DRX cycle of the UE, an indication that the UE is to transition to an active state during the on duration and identifying the one or more PCIs. In some examples, the WUS manager 1110 may determine one or more resources for a UE to use for transmitting a feedback signal.

In some examples, the WUS manager 1110 may transmit, prior to an on duration of a DRX cycle, an indication that the UE is to transition to an active state during the on duration, identifying one or more PCIs for the UE to communicate with, and identifying the one or more resources. In some examples, the WUS manager 1110 may identify, for a UE, a default configuration associated with the UE failing to detect an indication of whether the UE is to transition to an active state or remain in an inactive state during an on duration of a DRX cycle during a corresponding monitoring period. In some examples, the WUS manager 1110 may transmit a configuration signal to the UE indicating the default configuration. In some examples, the WUS manager 1110 may transmit, prior to a second on duration of the DRX cycle, an indication that the UE is to transition to an active state of the DRX cycle during the second on duration.

In some examples, the WUS manager 1110 may transmit, to a UE and prior to an on duration of a DRX cycle, an indication that the UE is to transition to an active state of a DRX cycle during the on duration, the indication identifying a first subset of one or more PCIs for the UE to communicate with.

In some cases, the first indication is transmitted in a first WUS and the second indication is transmitted in a second WUS. In some cases, the indication is transmitted in at least one of a WUS or a non-WUS DCI. In some cases, the indication is transmitted in a WUS. In some cases, the configuration signal includes at least one of a DCI, or a MAC CE, or a RRC signal, or a combination thereof. In some cases, the indication is transmitted in a WUS and the downlink grant includes a DCI. In some cases, the downlink signal includes at least one of a DCI, or a MAC CE, or a RRC signal, or a combination thereof.

The PCI manager 1115 may determine one or more PCIs for the UE to communicate with. In some examples, the PCI manager 1115 may identify, for a UE and based on an activation period of a serving cell, one or more PCIs available for the UE to communicate with.

The on duration manager 1130 may receive the feedback signal over the one or more resources, the feedback signal acknowledging that the UE was able to successfully decode the indication. In some examples, the on duration manager 1130 may transmit, to a UE and while the UE is in an active state during a first on duration of a DRX cycle, a downlink grant identifying one or more PCIs for the UE to communicate with. In some examples, the on duration manager 1130 may transmit, during the on duration, a downlink signal identifying a second subset of one or more PCIs for the UE to communicate with. In some cases, the feedback signal is received during the on duration or after the on duration. In some cases, the feedback signal includes a HARQ ACK/NACK message.

The channel status manager 1120 may receive, during the first on duration, a channel status report from the UE based on a result of the UE monitoring reference signals associated with at least one of the one or more PCIs.

The UE capability manager 1125 may receive a UE capability message indicating a cell switching time of the UE to switch to a new serving cell, where the one or more PCIs are included in the indication based on the switching time of the UE and the activation period of each corresponding serving cell, each serving cell including at least one of one or more transmission reception points of a same serving cell or one or more serving cells in a group of candidate serving cells.

The application window manager 1135 may identify an application window for the one or more PCIs, where the one or more PCIs are identified in the downlink grant based on the application window.

In some cases, the application window includes at least one of a next on duration of the DRX cycle, or a set of subsequent one or more on durations of the DRX cycle following the on duration in which the downlink grant was transmitted, or until an indication is transmitted updating the one or more PCIs. In some cases, the downlink grant indicates the application window for the one or more PCIs.

The confirmation manager 1140 may receive, during an initial portion of the on duration, a confirmation that the UE has switched to serving cells associated with the first subset of the one or more PCIs, where the downlink signal is transmitted in response to receiving the confirmation.

Figure 12:
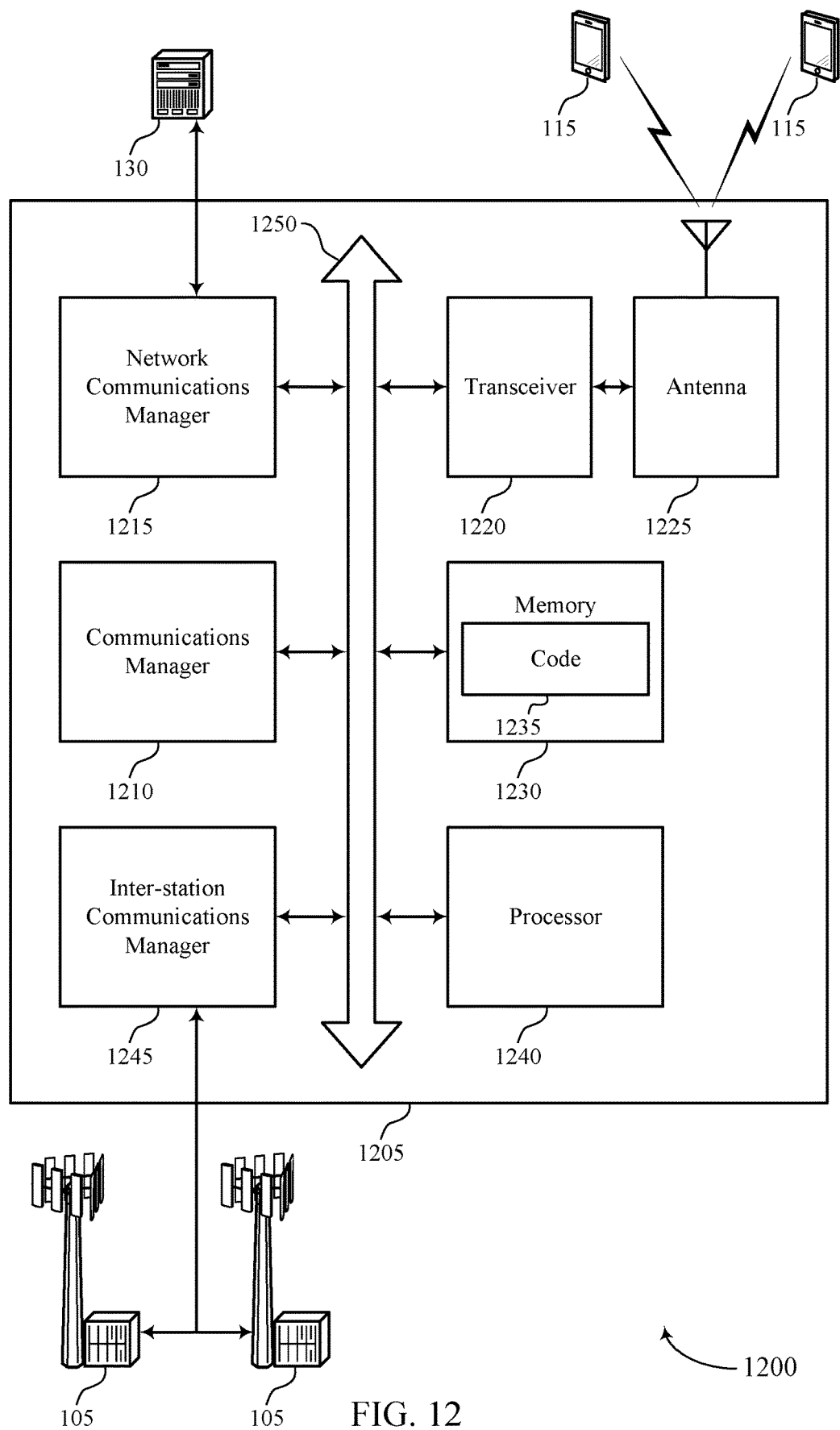
FIG. 12 shows a diagram of a system including a device that supports WUS selected cell indication for mobility in accordance with aspects of the present disclosure.

FIG. 12 shows a diagram of a system 1200 including a device 1205 that supports WUS selected cell indication for mobility in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE and prior to a first on duration of a DRX cycle, a first indication that the UE is to remain in an inactive state of the DRX cycle during the first on duration, transmit, prior to a second on duration of the DRX cycle, a second indication that the UE is to transition to an active state during the second on duration, where the second indication indicates, based on the first indication indicating that the UE is to remain in the inactive state during the first on duration, and the one or more PCIs for the UE to communicate with while in the active state, and determine one or more PCIs for the UE to communicate with.

The communications manager 1210 may also identify, for a UE and based on an activation period of a serving cell, one or more PCIs available for the UE to communicate with and transmit, prior to an on duration of a DRX cycle of the UE, an indication that the UE is to transition to an active state during the on duration and identifying the one or more PCIs.

The communications manager 1210 may also determine one or more resources for a UE to use for transmitting a feedback signal, transmit, prior to an on duration of a DRX cycle, an indication that the UE is to transition to an active state during the on duration, identifying one or more PCIs for the UE to communicate with, and identifying the one or more resources, and receive the feedback signal over the one or more resources, the feedback signal acknowledging that the UE was able to successfully decode the indication.

The communications manager 1210 may also identify, for a UE, a default configuration associated with the UE failing to detect an indication of whether the UE is to transition to an active state or remain in an inactive state during an on duration of a DRX cycle during a corresponding monitoring period and transmit a configuration signal to the UE indicating the default configuration.

The communications manager 1210 may also transmit, to a UE and while the UE is in an active state during a first on duration of a DRX cycle, a downlink grant identifying one or more PCIs for the UE to communicate with and transmit, prior to a second on duration of the DRX cycle, an indication that the UE is to transition to an active state of the DRX cycle during the second on duration.

The communications manager 1210 may also transmit, to a UE and prior to an on duration of a DRX cycle, an indication that the UE is to transition to an active state of a DRX cycle during the on duration, the indication identifying a first subset of one or more PCIs for the UE to communicate with and transmit, during the on duration, a downlink signal identifying a second subset of one or more PCIs for the UE to communicate with.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting WUS selected cell indication for mobility).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
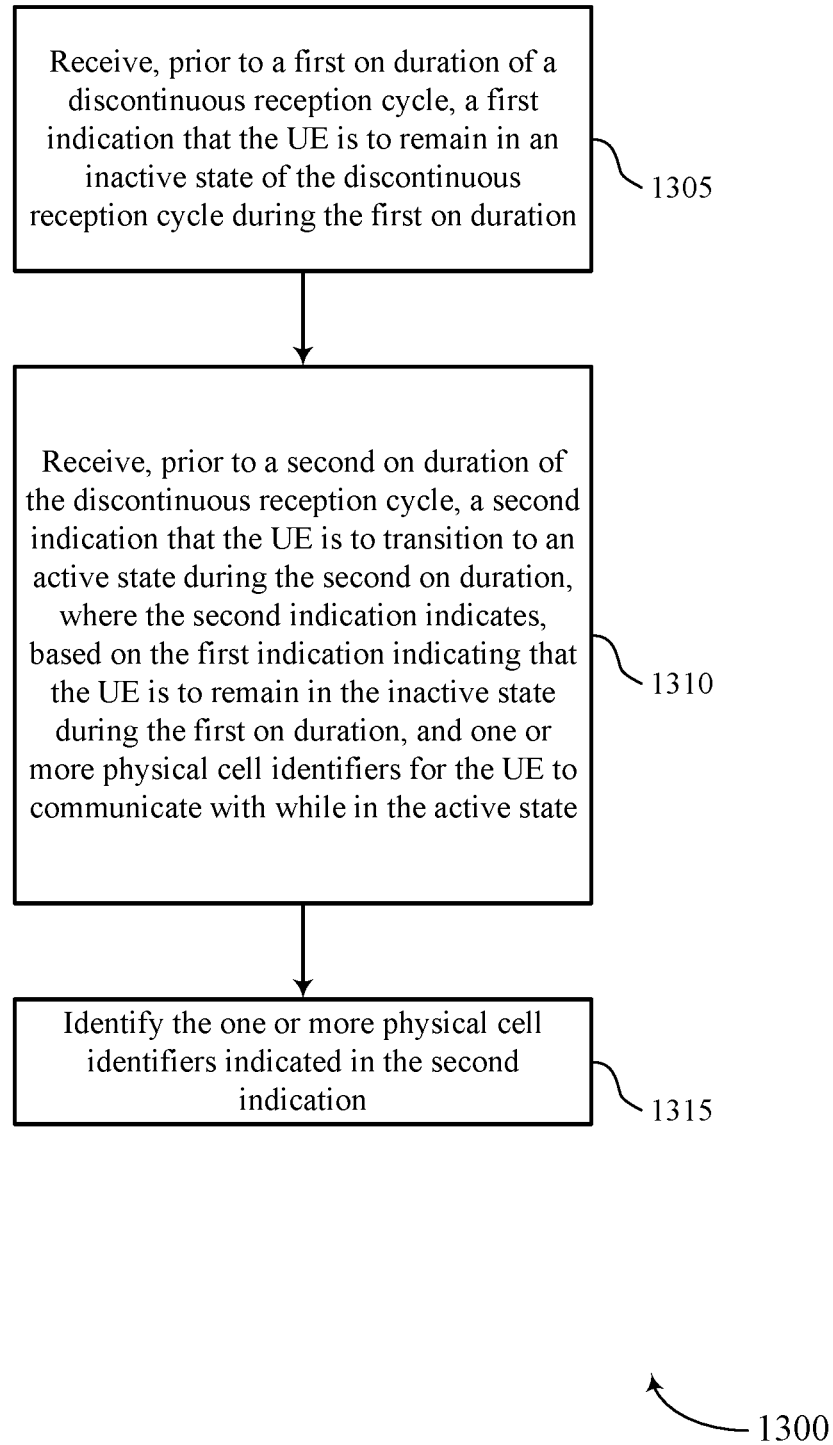
FIGS. 13 through 18 show flowcharts illustrating methods that support WUS selected cell indication for mobility in accordance with aspects of the present disclosure.

FIG. 13 shows a flowchart illustrating a method 1300 that supports WUS selected cell indication for mobility in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive, prior to a first on duration of a DRX cycle, a first indication that the UE is to remain in an inactive state of the DRX cycle during the first on duration. The operations of 1305 may be performed according to the methods described herein. In some examples, aspects of the operations of 1305 may be performed by a WUS manager as described with reference to FIGS. 5 through 8.

At 1310, the UE may receive, prior to a second on duration of the DRX cycle, a second indication that the UE is to transition to an active state during the second on duration, where the second indication indicates, based on the first indication indicating that the UE is to remain in the inactive state during the first on duration, and one or more PCIs for the UE to communicate with while in the active state. The operations of 1310 may be performed according to the methods described herein. In some examples, aspects of the operations of 1310 may be performed by a WUS manager as described with reference to FIGS. 5 through 8.

At 1315, the UE may identify the one or more PCIs indicated in the second indication. The operations of 1315 may be performed according to the methods described herein. In some examples, aspects of the operations of 1315 may be performed by a PCI manager as described with reference to FIGS. 5 through 8.

Figure 14:
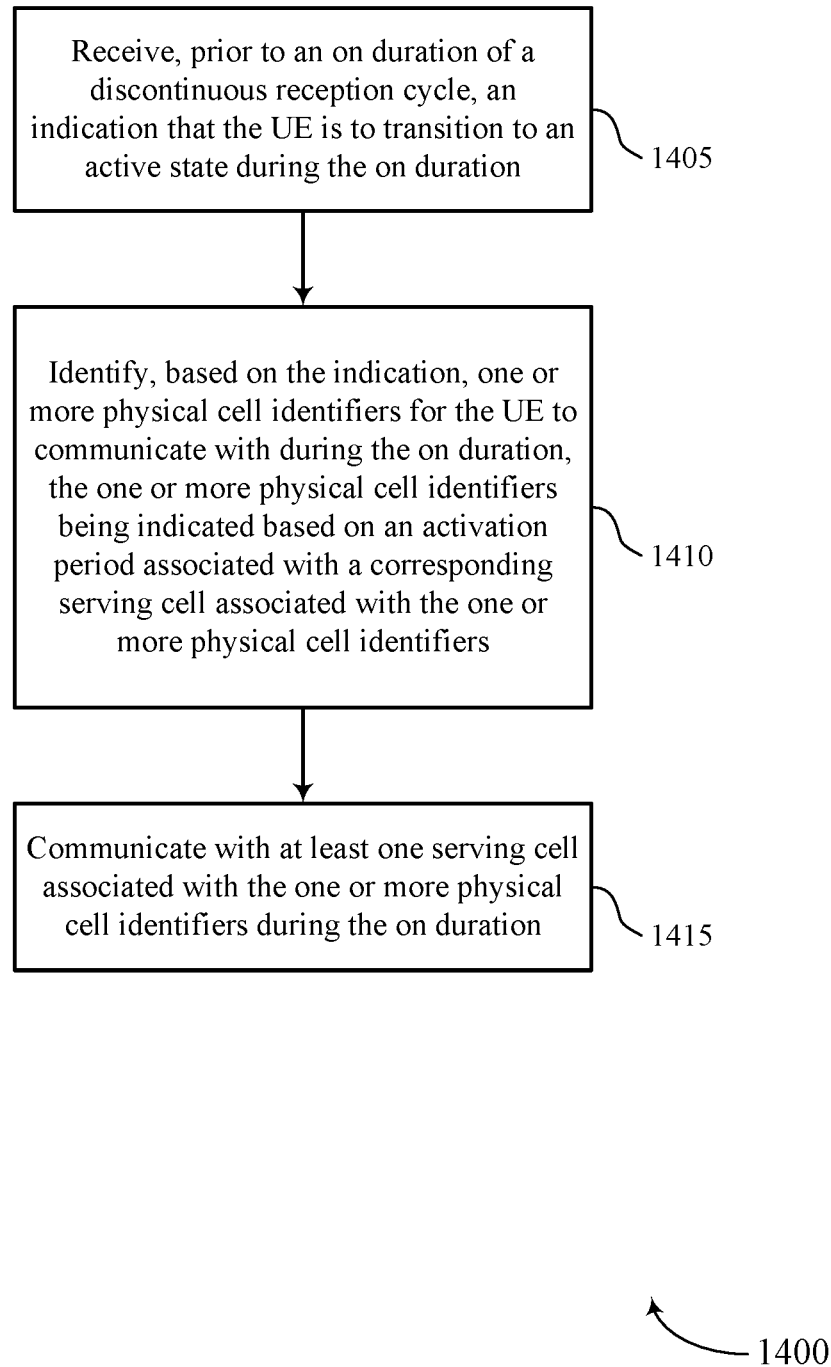

FIG. 14 shows a flowchart illustrating a method 1400 that supports WUS selected cell indication for mobility in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may receive, prior to an on duration of a DRX cycle, an indication that the UE is to transition to an active state during the on duration. The operations of 1405 may be performed according to the methods described herein. In some examples, aspects of the operations of 1405 may be performed by a WUS manager as described with reference to FIGS. 5 through 8.

At 1410, the UE may identify, based on the indication, one or more PCIs for the UE to communicate with during the on duration, the one or more PCIs being indicated based on an activation period associated with a corresponding serving cell associated with the one or more PCIs. The operations of 1410 may be performed according to the methods described herein. In some examples, aspects of the operations of 1410 may be performed by a PCI manager as described with reference to FIGS. 5 through 8.

At 1415, the UE may communicate with at least one serving cell associated with the one or more PCIs during the on duration. The operations of 1415 may be performed according to the methods described herein. In some examples, aspects of the operations of 1415 may be performed by a PCI manager as described with reference to FIGS. 5 through 8.

Figure 15:
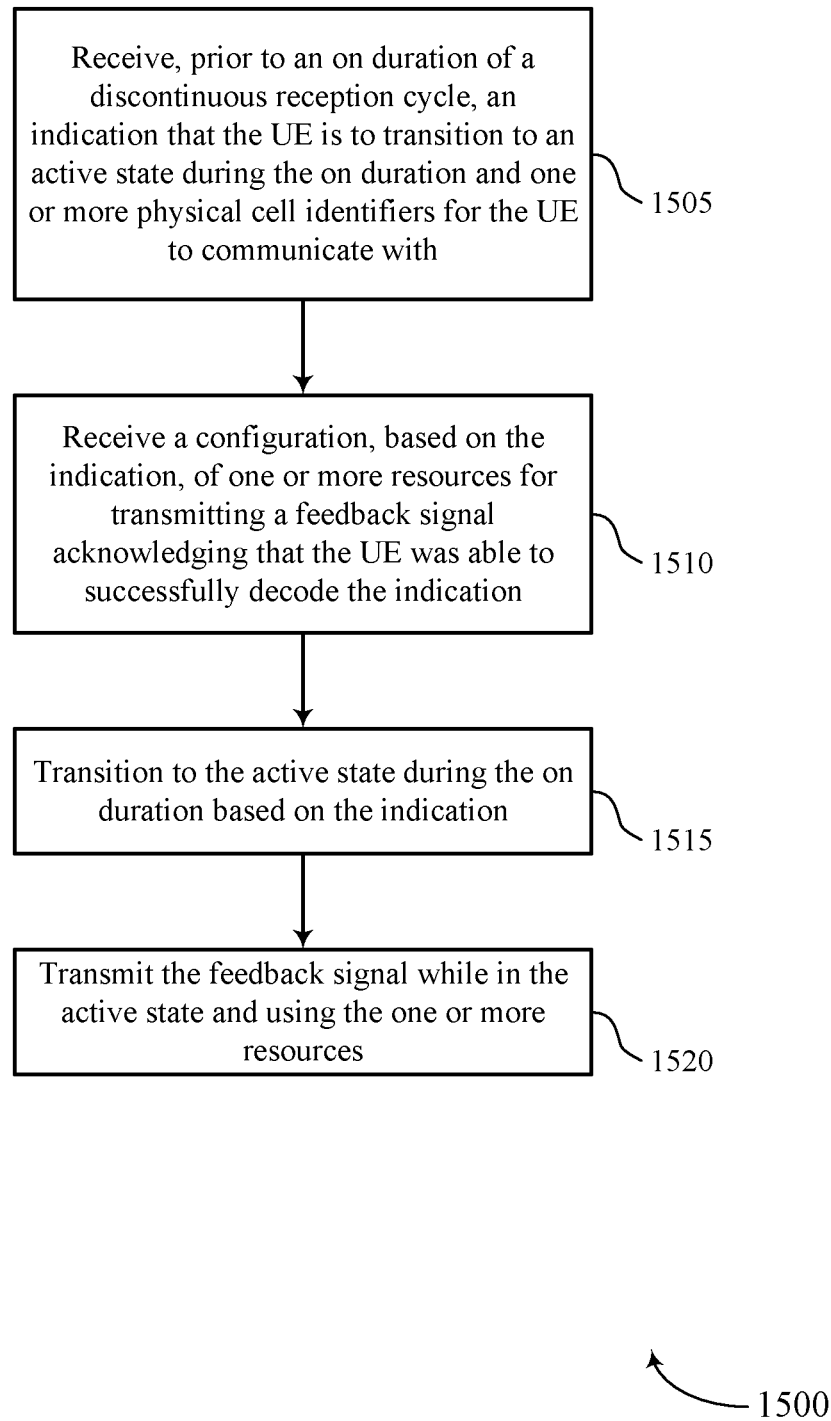

FIG. 15 shows a flowchart illustrating a method 1500 that supports WUS selected cell indication for mobility in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive, prior to an on duration of a DRX cycle, an indication that the UE is to transition to an active state during the on duration and one or more PCIs for the UE to communicate with. The operations of 1505 may be performed according to the methods described herein. In some examples, aspects of the operations of 1505 may be performed by a WUS manager as described with reference to FIGS. 5 through 8.

At 1510, the UE may receive a configuration, based on the indication, of one or more resources for transmitting a feedback signal acknowledging that the UE was able to successfully decode the indication. The operations of 1510 may be performed according to the methods described herein. In some examples, aspects of the operations of 1510 may be performed by a WUS manager as described with reference to FIGS. 5 through 8.

At 1515, the UE may transition to the active state during the on duration based on the indication. The operations of 1515 may be performed according to the methods described herein. In some examples, aspects of the operations of 1515 may be performed by an on duration manager as described with reference to FIGS. 5 through 8.

At 1520, the UE may transmit the feedback signal while in the active state and using the one or more resources. The operations of 1520 may be performed according to the methods described herein. In some examples, aspects of the operations of 1520 may be performed by a PCI manager as described with reference to FIGS. 5 through 8.

Figure 16:
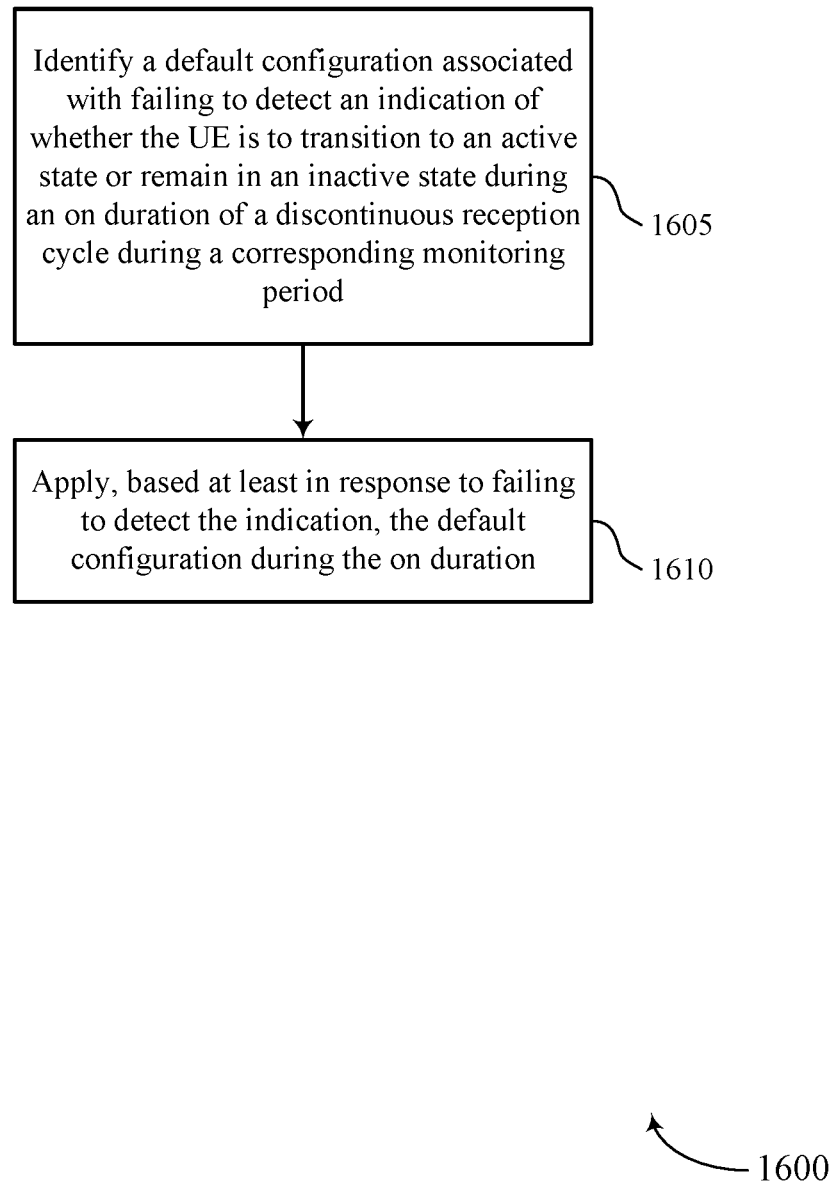

FIG. 16 shows a flowchart illustrating a method 1600 that supports WUS selected cell indication for mobility in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may identify a default configuration associated with failing to detect an indication of whether the UE is to transition to an active state or remain in an inactive state during an on duration of a DRX cycle during a corresponding monitoring period. The operations of 1605 may be performed according to the methods described herein. In some examples, aspects of the operations of 1605 may be performed by a WUS manager as described with reference to FIGS. 5 through 8.

At 1610, the UE may apply, based at least in response to failing to detect the indication, the default configuration during the on duration. The operations of 1610 may be performed according to the methods described herein. In some examples, aspects of the operations of 1610 may be performed by a WUS manager as described with reference to FIGS. 5 through 8.

Figure 17:
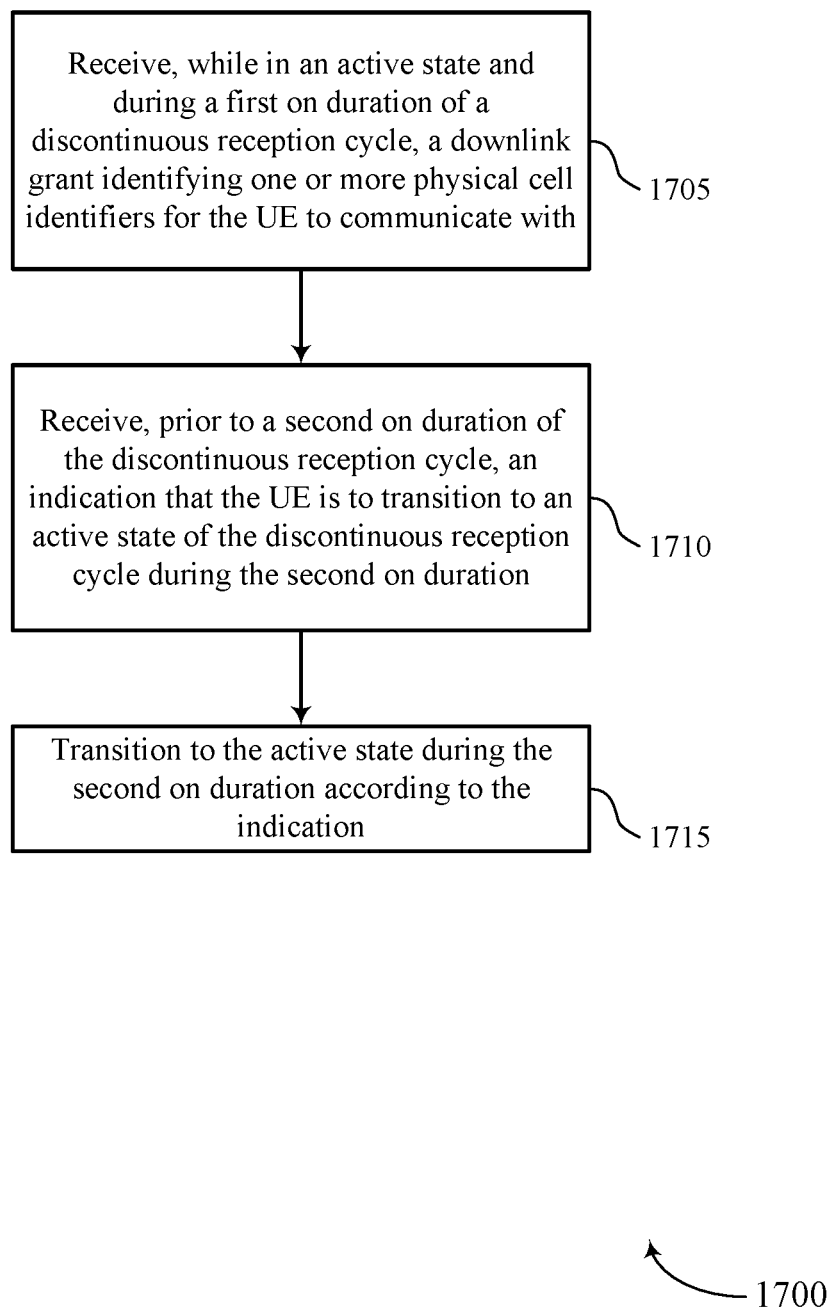

FIG. 17 shows a flowchart illustrating a method 1700 that supports WUS selected cell indication for mobility in accordance with aspects of the present disclosure. The operations of method 1700 may be implemented by a UE 115 or its components as described herein. For example, the operations of method 1700 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1705, the UE may receive, while in an active state and during a first on duration of a DRX cycle, a downlink grant identifying one or more PCIs for the UE to communicate with. The operations of 1705 may be performed according to the methods described herein. In some examples, aspects of the operations of 1705 may be performed by an on duration manager as described with reference to FIGS. 5 through 8.

At 1710, the UE may receive, prior to a second on duration of the DRX cycle, an indication that the UE is to transition to an active state of the DRX cycle during the second on duration. The operations of 1710 may be performed according to the methods described herein. In some examples, aspects of the operations of 1710 may be performed by a WUS manager as described with reference to FIGS. 5 through 8.

At 1715, the UE may transition to the active state during the second on duration according to the indication. The operations of 1715 may be performed according to the methods described herein. In some examples, aspects of the operations of 1715 may be performed by an on duration manager as described with reference to FIGS. 5 through 8.

Figure 18:
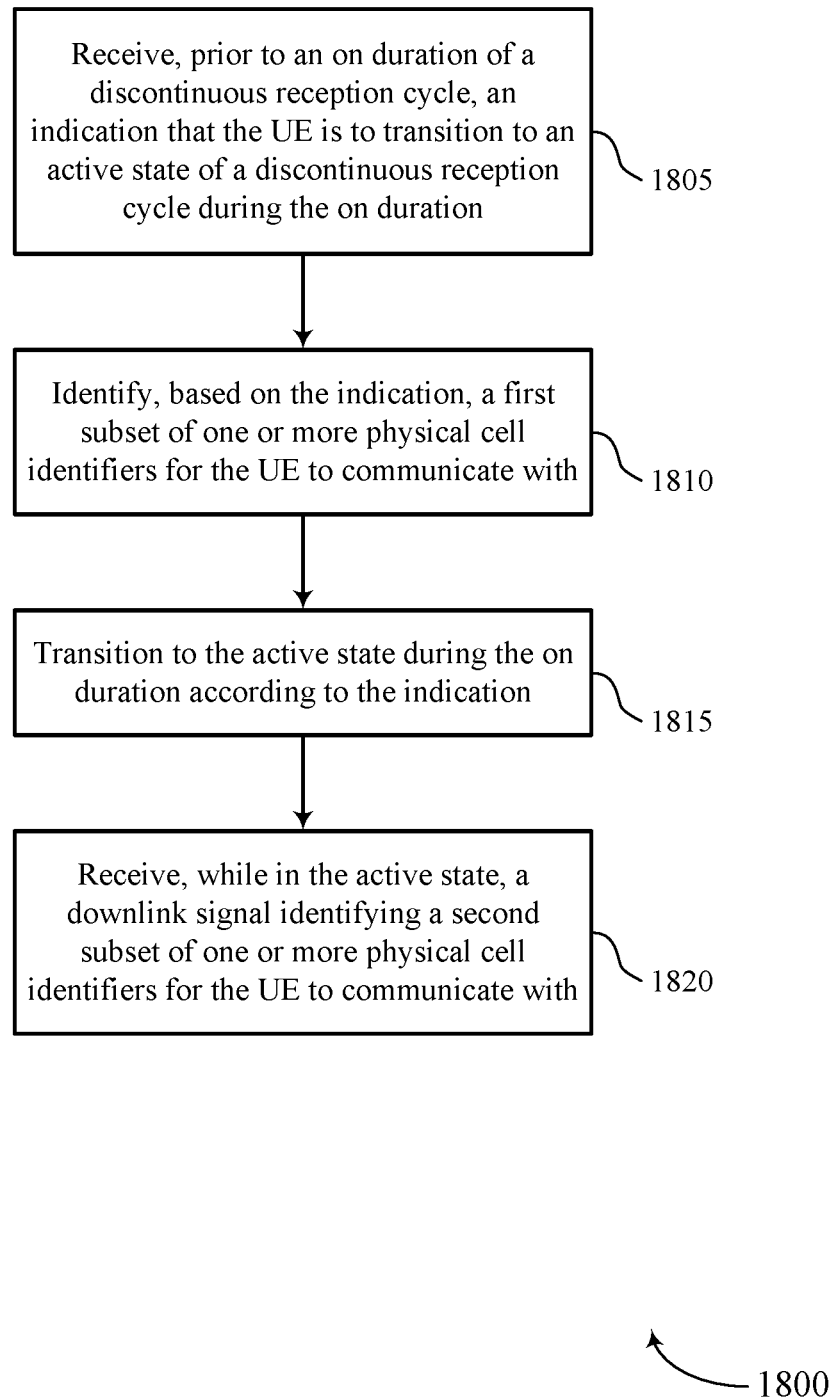

FIG. 18 shows a flowchart illustrating a method 1800 that supports WUS selected cell indication for mobility in accordance with aspects of the present disclosure. The operations of method 1800 may be implemented by a UE 115 or its components as described herein. For example, the operations of method 1800 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1805, the UE may receive, prior to an on duration of a DRX cycle, an indication that the UE is to transition to an active state of a DRX cycle during the on duration. The operations of 1805 may be performed according to the methods described herein. In some examples, aspects of the operations of 1805 may be performed by a WUS manager as described with reference to FIGS. 5 through 8.

At 1810, the UE may identify, based on the indication, a first subset of one or more PCIs for the UE to communicate with. The operations of 1810 may be performed according to the methods described herein. In some examples, aspects of the operations of 1810 may be performed by a PCI manager as described with reference to FIGS. 5 through 8.

At 1815, the UE may transition to the active state during the on duration according to the indication. The operations of 1815 may be performed according to the methods described herein. In some examples, aspects of the operations of 1815 may be performed by an on duration manager as described with reference to FIGS. 5 through 8.

At 1820, the UE may receive, while in the active state, a downlink signal identifying a second subset of one or more PCIs for the UE to communicate with. The operations of 1820 may be performed according to the methods described herein. In some examples, aspects of the operations of 1820 may be performed by a PCI manager as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: receiving, prior to a first on duration of a DRX cycle, a first indication that the UE is to remain in an inactive state of the DRX cycle during the first on duration; receiving, prior to a second on duration of the DRX cycle, a second indication that the UE is to transition to an active state during the second on duration, wherein the second indication indicates, based at least in part on the first indication indicating that the UE is to remain in the inactive state during the first on duration, and one or more PCIs for the UE to communicate with while in the active state; and identifying the one or more PCIs indicated in the second indication.

Aspect 2: The method of aspect 1, further comprising: monitoring reference signals, during the first on duration, associated with the identified one or more PCIs; and transmitting, during the first on duration, a channel status report based at least in part on the monitoring.

Aspect 3: The method of aspect 2, wherein the channel status report is transmitted to a base station associated with the first indication and the second indication.

Aspect 4: The method of any of aspects 1 through 3, further comprising: performing a cell switching procedure with a serving cell associated with at least one of the identified one or more PCIs.

Aspect 5: The method of aspect 4, wherein the serving cell comprises at least one of one or more transmission reception points of a same serving cell or one or more serving cells in a group of candidate serving cells.

Aspect 6: The method of any of aspects 1 through 5, wherein the first indication is received in a first WUS and the second indication is received in a second WUS.

Aspect 7: A method for wireless communication at a UE, comprising: receiving, prior to an on duration of a DRX cycle, an indication that the UE is to transition to an active state during the on duration; identifying, based at least in part on the indication, one or more PCIs for the UE to communicate with during the on duration, the one or more PCIs being indicated based at least in part on an activation period associated with a corresponding serving cell associated with the one or more PCIs; and communicating with at least one serving cell associated with the one or more PCIs during the on duration.

Aspect 8: The method of aspect 7, further comprising: transmitting a UE capability message indicating a cell switching time of the UE to switch to a new serving cell, wherein the one or more PCIs are included in the indication based at least in part on the cell switching time of the UE and the activation period of each corresponding serving cell.

Aspect 9: The method of any of aspects 7 through 8, further comprising: performing a cell switching procedure with a serving cell associated with at least one of the identified one or more PCIs.

Aspect 10: The method of aspect 9, wherein the serving cell comprises at least one of one or more transmission reception points of a same serving cell or one or more serving cells in a group of candidate serving cells.

Aspect 11: The method of any of aspects 7 through 10, wherein the indication is received in at least one of a WUS or a non-WUS DCI.

Aspect 12: A method for wireless communication at a UE, comprising: receiving, prior to an on duration of a DRX cycle, an indication that the UE is to transition to an active state during the on duration and one or more PCIs for the UE to communicate with; receiving a configuration, based at least in part on the indication, of one or more resources for transmitting a feedback signal acknowledging that the UE was able to successfully decode the indication; transitioning to the active state during the on duration based at least in part on the indication; and transmitting the feedback signal while in the active state and using the one or more resources.

Aspect 13: The method of aspect 12, wherein the feedback signal is transmitted during the on duration or after the on duration.

Aspect 14: The method of any of aspects 12 through 13, further comprising: performing a cell switching procedure with a serving cell associated with at least one of the one or more PCIs.

Aspect 15: The method of aspect 14, wherein the serving cell comprises at least one of one or more transmission reception points of a same serving cell or one or more serving cells in a group of candidate serving cells.

Aspect 16: The method of any of aspects 12 through 15, wherein the indication is received in a WUS.

Aspect 17: The method of any of aspects 12 through 16, wherein the feedback signal comprises a HARQ ACK/NACK message.

Aspect 18: A method for wireless communication at a UE, comprising: identifying a default configuration associated with failing to detect an indication of whether the UE is to transition to an active state or remain in an inactive state during an on duration of a DRX cycle during a corresponding monitoring period; and applying, based at least in response to failing to detect the indication, the default configuration during the on duration.

Aspect 19: The method of aspect 18, wherein applying the default configuration comprises: transitioning to the active state during the on duration based at least in part on failing to detect the indication.

Aspect 20: The method of aspect 19, further comprising: remaining in the active state until a monitoring occasion associated with detecting a second indication.

Aspect 21: The method of any of aspects 18 through 20, wherein applying the default configuration comprises: remaining in the inactive state during the on duration based at least in part on failing to detect the indication.

Aspect 22: The method of aspect 21, further comprising: remaining in the inactive state until a monitoring occasion associated with detecting a second indication.

Aspect 23: The method of any of aspects 18 through 22, further comprising: receiving a configuration signal indicating the default configuration.

Aspect 24: The method of aspect 23, wherein the configuration signal comprises at least one of a DCI, or a MAC CE, or an RRC signal, or a combination thereof.

Aspect 25: A method for wireless communication at a UE, comprising: receiving, while in an active state and during a first on duration of a DRX cycle, a downlink grant identifying one or more PCIs for the UE to communicate with; receiving, prior to a second on duration of the DRX cycle, an indication that the UE is to transition to an active state of the DRX cycle during the second on duration; and transitioning to the active state during the second on duration according to the indication.

Aspect 26: The method of aspect 25, further comprising: identifying an application window for the one or more PCIs; and communicating with the one or more PCIs based at least in part on the application window.

Aspect 27: The method of aspect 26, wherein the application window comprises at least one of a next on duration of the DRX cycle, or a set of subsequent one or more on durations of the DRX cycle following the on duration in which the downlink grant was received, or until an indication is received updating the one or more PCIs.

Aspect 28: The method of any of aspects 26 through 27, wherein the downlink grant indicates the application window for the one or more PCIs.

Aspect 29: The method of any of aspects 25 through 28, wherein the indication is received in a WUS and the downlink grant comprises a DCI.

Aspect 30: The method of any of aspects 25 through 29, further comprising: performing a cell switching procedure with a serving cell associated with at least one of the identified one or more PCIs.

Aspect 31: The method of aspect 30, wherein the serving cell comprises at least one of one or more transmission reception points of a same serving cell or one or more serving cells in a group of candidate serving cells.

Aspect 32: A method for wireless communication at a UE, comprising: receiving, prior to an on duration of a DRX cycle, an indication that the UE is to transition to an active state of a DRX cycle during the on duration; identifying, based at least in part on the indication, a first subset of one or more PCIs for the UE to communicate with; transitioning to the active state during the on duration according to the indication; and receiving, while in the active state, a downlink signal identifying a second subset of one or more PCIs for the UE to communicate with.

Aspect 33: The method of aspect 32, further comprising: transmitting, during an initial portion of the on duration, a confirmation that the UE has switched to serving cells associated with the first subset of the one or more PCIs, wherein the downlink signal is received in response to transmitting the confirmation.

Aspect 34: The method of aspect 33, wherein the downlink signal is received from at least one PCI of the first subset of the one or more PCIs.

Aspect 35: The method of any of aspects 32 through 34, wherein the downlink signal comprises at least one of a DCI, or a MAC CE, or an RRC signal, or a combination thereof.

Aspect 36: A method for wireless communication at a base station, comprising: transmitting, to a UE and prior to a first on duration of a DRX cycle, a first indication that the UE is to remain in an inactive state of the DRX cycle during the first on duration; determining one or more PCIs for the UE to communicate with; and transmitting, prior to a second on duration of the DRX cycle, a second indication that the UE is to transition to an active state during the second on duration, wherein the second indication indicates, based at least in part on the first indication indicating that the UE is to remain in the inactive state during the first on duration, and the one or more PCIs for the UE to communicate with while in the active state.

Aspect 37: The method of aspect 36, further comprising: receiving, during the first on duration, a channel status report from the UE based at least in part on a result of the UE monitoring reference signals associated with at least one of the one or more PCIs.

Aspect 38: The method of any of aspects 36 through 37, wherein the first indication is transmitted in a first WUS and the second indication is transmitted in a second WUS.

Aspect 39: A method for wireless communication at a base station, comprising: identifying, for a UE and based at least in part on an activation period of a serving cell, one or more PCIs available for the UE to communicate with; and transmitting, prior to an on duration of a DRX cycle of the UE, an indication that the UE is to transition to an active state during the on duration and identifying the one or more PCIs.

Aspect 40: The method of aspect 39, further comprising: receiving a UE capability message indicating a cell switching time of the UE to switch to a new serving cell, wherein the one or more PCIs are included in the indication based at least in part on the switching time of the UE and the activation period of each corresponding serving cell, each serving cell comprising at least one of one or more transmission reception points of a same serving cell or one or more serving cells in a group of candidate serving cells.

Aspect 41: The method of any of aspects 39 through 40, wherein the indication is transmitted in at least one of a WUS or a non-WUS DCI.

Aspect 42: A method for wireless communication at a base station, comprising: determining one or more resources for a UE to use for transmitting a feedback signal; transmitting, prior to an on duration of a DRX cycle, an indication that the UE is to transition to an active state during the on duration, identifying one or more PCIs for the UE to communicate with, and identifying the one or more resources; and receiving the feedback signal over the one or more resources, the feedback signal acknowledging that the UE was able to successfully decode the indication.

Aspect 43: The method of aspect 42, wherein the feedback signal is received during the on duration or after the on duration.

Aspect 44: The method of any of aspects 42 through 43, wherein the indication is transmitted in a WUS.

Aspect 45: The method of any of aspects 42 through 44, wherein the feedback signal comprises a HARQ ACK/NACK message.

Aspect 46: A method for wireless communication at a base station, comprising: identifying, for a UE, a default configuration associated with the UE failing to detect an indication of whether the UE is to transition to an active state or remain in an inactive state during an on duration of a DRX cycle during a corresponding monitoring period; and transmitting a configuration signal to the UE indicating the default configuration.

Aspect 47: The method of aspect 46, wherein the configuration signal comprises at least one of a DCI, or a MAC CE, or an RRC signal, or a combination thereof.

Aspect 48: A method for wireless communication at a base station, comprising: transmitting, to a UE and while the UE is in an active state during a first on duration of a DRX cycle, a downlink grant identifying one or more PCIs for the UE to communicate with; and transmitting, prior to a second on duration of the DRX cycle, an indication that the UE is to transition to an active state of the DRX cycle during the second on duration.

Aspect 49: The method of aspect 48, further comprising: identifying an application window for the one or more PCIs, wherein the one or more PCIs are identified in the downlink grant based at least in part on the application window.

Aspect 50: The method of aspect 49, wherein the application window comprises at least one of a next on duration of the DRX cycle, or a set of subsequent one or more on durations of the DRX cycle following the on duration in which the downlink grant was transmitted, or until an indication is transmitted updating the one or more PCIs.

Aspect 51: The method of any of aspects 49 through 50, wherein the downlink grant indicates the application window for the one or more PCIs.

Aspect 52: The method of any of aspects 48 through 51, wherein the indication is transmitted in a WUS and the downlink grant comprises a DCI.

Aspect 53: A method for wireless communication at a base station, comprising: transmitting, to a UE and prior to an on duration of a DRX cycle, an indication that the UE is to transition to an active state of a DRX cycle during the on duration, the indication identifying a first subset of one or more PCIs for the UE to communicate with; and transmitting, during the on duration, a downlink signal identifying a second subset of one or more PCIs for the UE to communicate with.

Aspect 54: The method of aspect 53, further comprising: receiving, during an initial portion of the on duration, a confirmation that the UE has switched to serving cells associated with the first subset of the one or more PCIs, wherein the downlink signal is transmitted in response to receiving the confirmation.

Aspect 55: The method of any of aspects 53 through 54, wherein the downlink signal comprises at least one of a DCI, or a MAC CE, or an RRC signal, or a combination thereof.

Aspect 56: An apparatus for wireless communication at a UE, comprising a processor; memory coupled with the processor; and instructions stored in the memory and executable by the processor to cause the apparatus to perform a method of any of aspects 1 through 6.

Aspect 57: An apparatus for wireless communication at a UE, comprising at least one means for performing a method of any of aspects 1 through 6.

Aspect 58: A non-transitory computer-readable medium storing code for wireless communication at a UE, the code comprising instructions executable by a processor to perform a method of any of aspects 1 through 6.

Aspect 59: An apparatus for wireless communication at a UE, comprising a processor; memory coupled with the processor; and instructions stored in the memory and executable by the processor to cause the apparatus to perform a method of any of aspects 7 through 11.

Aspect 60: An apparatus for wireless communication at a UE, comprising at least one means for performing a method of any of aspects 7 through 11.

Aspect 61: A non-transitory computer-readable medium storing code for wireless communication at a UE, the code comprising instructions executable by a processor to perform a method of any of aspects 7 through 11.

Aspect 62: An apparatus for wireless communication at a UE, comprising a processor; memory coupled with the processor; and instructions stored in the memory and executable by the processor to cause the apparatus to perform a method of any of aspects 12 through 17.

Aspect 63: An apparatus for wireless communication at a UE, comprising at least one means for performing a method of any of aspects 12 through 17.

Aspect 64: A non-transitory computer-readable medium storing code for wireless communication at a UE, the code comprising instructions executable by a processor to perform a method of any of aspects 12 through 17.

Aspect 65: An apparatus for wireless communication at a UE, comprising a processor; memory coupled with the processor; and instructions stored in the memory and executable by the processor to cause the apparatus to perform a method of any of aspects 18 through 24.

Aspect 66: An apparatus for wireless communication at a UE, comprising at least one means for performing a method of any of aspects 18 through 24.

Aspect 67: A non-transitory computer-readable medium storing code for wireless communication at a UE, the code comprising instructions executable by a processor to perform a method of any of aspects 18 through 24.

Aspect 68: An apparatus for wireless communication at a UE, comprising a processor; memory coupled with the processor; and instructions stored in the memory and executable by the processor to cause the apparatus to perform a method of any of aspects 25 through 31.

Aspect 69: An apparatus for wireless communication at a UE, comprising at least one means for performing a method of any of aspects 25 through 31.

Aspect 70: A non-transitory computer-readable medium storing code for wireless communication at a UE, the code comprising instructions executable by a processor to perform a method of any of aspects 25 through 31.

Aspect 71: An apparatus for wireless communication at a UE, comprising a processor; memory coupled with the processor; and instructions stored in the memory and executable by the processor to cause the apparatus to perform a method of any of aspects 32 through 35.

Aspect 72: An apparatus for wireless communication at a UE, comprising at least one means for performing a method of any of aspects 32 through 35.

Aspect 73: A non-transitory computer-readable medium storing code for wireless communication at a UE, the code comprising instructions executable by a processor to perform a method of any of aspects 32 through 35.

Aspect 74: An apparatus for wireless communication at a base station, comprising a processor; memory coupled with the processor; and instructions stored in the memory and executable by the processor to cause the apparatus to perform a method of any of aspects 36 through 38.

Aspect 75: An apparatus for wireless communication at a base station, comprising at least one means for performing a method of any of aspects 36 through 38.

Aspect 76: A non-transitory computer-readable medium storing code for wireless communication at a base station, the code comprising instructions executable by a processor to perform a method of any of aspects 36 through 38.

Aspect 77: An apparatus for wireless communication at a base station, comprising a processor; memory coupled with the processor; and instructions stored in the memory and executable by the processor to cause the apparatus to perform a method of any of aspects 39 through 41.

Aspect 78: An apparatus for wireless communication at a base station, comprising at least one means for performing a method of any of aspects 39 through 41.

Aspect 79: A non-transitory computer-readable medium storing code for wireless communication at a base station, the code comprising instructions executable by a processor to perform a method of any of aspects 39 through 41.

Aspect 80: An apparatus for wireless communication at a base station, comprising a processor; memory coupled with the processor; and instructions stored in the memory and executable by the processor to cause the apparatus to perform a method of any of aspects 42 through 45.

Aspect 81: An apparatus for wireless communication at a base station, comprising at least one means for performing a method of any of aspects 42 through 45.

Aspect 82: A non-transitory computer-readable medium storing code for wireless communication at a base station, the code comprising instructions executable by a processor to perform a method of any of aspects 42 through 45.

Aspect 83: An apparatus for wireless communication at a base station, comprising a processor; memory coupled with the processor; and instructions stored in the memory and executable by the processor to cause the apparatus to perform a method of any of aspects 46 through 47.

Aspect 84: An apparatus for wireless communication at a base station, comprising at least one means for performing a method of any of aspects 46 through 47.

Aspect 85: A non-transitory computer-readable medium storing code for wireless communication at a base station, the code comprising instructions executable by a processor to perform a method of any of aspects 46 through 47.

Aspect 86: An apparatus for wireless communication at a base station, comprising a processor; memory coupled with the processor; and instructions stored in the memory and executable by the processor to cause the apparatus to perform a method of any of aspects 48 through 52.

Aspect 87: An apparatus for wireless communication at a base station, comprising at least one means for performing a method of any of aspects 48 through 52.

Aspect 88: A non-transitory computer-readable medium storing code for wireless communication at a base station, the code comprising instructions executable by a processor to perform a method of any of aspects 48 through 52.

Aspect 89: An apparatus for wireless communication at a base station, comprising a processor; memory coupled with the processor; and instructions stored in the memory and executable by the processor to cause the apparatus to perform a method of any of aspects 53 through 55.

Aspect 90: An apparatus for wireless communication at a base station, comprising at least one means for performing a method of any of aspects 53 through 55.

Aspect 91: A non-transitory computer-readable medium storing code for wireless communication at a base station, the code comprising instructions executable by a processor to perform a method of any of aspects 53 through 55.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a configuration signal indicating a default configuration associated with a lack of detecting an indication of whether the UE is to transition to an active state or remain in an inactive state during an on duration of a discontinuous reception cycle during a corresponding monitoring period;
   monitoring for a wakeup signal comprising the indication of whether the UE is to transition to the active state or remain in the inactive state during the on duration of the discontinuous reception cycle, wherein the wakeup signal indicates a physical cell identifier or the wakeup signal indicates the physical cell identifier based at least in part on an offset between the wakeup signal and the on duration; and
   applying, at least in response to the lack of detecting the indication, the default configuration that is indicated in the configuration signal by remaining in the inactive state instead of transitioning to the active state during the on duration.

2. The method of claim 1, further comprising:
   remaining in the inactive state until a monitoring occasion associated with detecting a second indication.

3. The method of claim 1, wherein the configuration signal comprises at least one of a downlink control information (DCI), or a medium access control (MAC) control element (CE), or a radio resource control (RRC) signal, or a combination thereof.

4. The method of claim 1, further comprising:
   receiving an indication of a configuration identifying one or more resources for transmission of a feedback signal corresponding to the wakeup signal; and
   transmitting the feedback signal via the one or more resources.

5. The method of claim 4, wherein the feedback signal comprises a hybrid automatic/repeat request (HARQ) acknowledgement/negative-acknowledgement (ACK/NACK) message.

6. An apparatus for wireless communication at a user equipment (UE), comprising:
   one or more processors;
   one or more memories coupled with the one or more processors; and
   one or more processor-readable instructions stored in the one or more memories and executable by the one or more processors individually or collectively to cause the apparatus to:
      receive a configuration signal indicating a default configuration associated with a lack of detecting an indication of whether the UE is to transition to an active state or remain in an inactive state during an on duration of a discontinuous reception cycle during a corresponding monitoring period;
      monitor for a wakeup signal comprising the indication of whether the UE is to transition to the active state or remain in the inactive state during the on duration of the discontinuous reception cycle, wherein the wakeup signal indicates a physical cell identifier or the wakeup signal indicates the physical cell identifier based at least in part on an offset between the wakeup signal and the on duration; and
      apply, at least in response to the lack of detecting the indication, the default configuration that is indicated in the configuration signal by remaining in the inactive state instead of transitioning to the active state during the on duration.

7. The apparatus of claim 6, wherein the one or more processor-readable instructions stored in the one or more memories are further executable by the one or more processors individually or collectively to cause the apparatus to:
   remaining in the inactive state until a monitoring occasion associated with detecting a second indication.

8. The apparatus of claim 6, wherein the configuration signal comprises at least one of a downlink control information (DCI), or a medium access control (MAC) control element (CE), or a radio resource control (RRC) signal, or a combination thereof.

9. The apparatus of claim 6, wherein the one or more processor- readable instructions stored in the one or more memories are further executable by the one or more processors individually or collectively to cause the apparatus to:
   receive an indication of a configuration identifying one or more resources for transmission of a feedback signal corresponding to the wakeup signal; and
   transmit the feedback signal via the one or more resources.

10. The apparatus of claim 9, wherein the feedback signal comprises a hybrid automatic/repeat request (HARQ) acknowledgement/negative-acknowledgement (ACK/NACK) message.

11. A non-transitory computer-readable medium storing code for wireless communication, the code comprising instructions executable by one or more processors to:
   receive a configuration signal indicating a default configuration associated with a lack of detecting an indication of whether a user equipment (UE) is to transition to an active state or remain in an inactive state during an on duration of a discontinuous reception cycle during a corresponding monitoring period;
   monitor for a wakeup signal comprising the indication of whether the UE is to transition to the active state or remain in the inactive state during the on duration of the discontinuous reception cycle, wherein the wakeup signal indicates a physical cell identifier or the wakeup signal indicates the physical cell identifier based at least in part on an offset between the wakeup signal and the on duration; and
   apply, at least in response to the lack of detecting the indication, the default configuration that is indicated in the configuration signal by remaining in the inactive state instead of transitioning to the active state during the on duration.

12. The non-transitory computer-readable medium of claim 11, wherein the instructions are further executable by the one or more processors to:
   remaining in the inactive state until a monitoring occasion associated with detecting a second indication.

13. The non-transitory computer-readable medium of claim 11, wherein the configuration signal comprises at least one of a downlink control information (DCI), or a medium access control (MAC) control element (CE), or a radio resource control (RRC) signal, or a combination thereof.

14. The non-transitory computer-readable medium of claim 11, wherein the instructions are further executable by the one or more processors to:
- receive an indication of a configuration identifying one or more resources for transmission of a feedback signal corresponding to the wakeup signal; and
- transmit the feedback signal via the one or more resources.

15. The non-transitory computer-readable medium of claim 14, wherein the feedback signal comprises a hybrid automatic/repeat request (HARQ) acknowledgement/negative-acknowledgement (ACK/NACK) message.

16. A user equipment (UE) for wireless communication, comprising:
- means for receiving a configuration signal indicating a default configuration associated with a lack of detecting an indication of whether the UE is to transition to an active state or remain in an inactive state during an on duration of a discontinuous reception cycle during a corresponding monitoring period;
- means for monitoring for a wakeup signal comprising the indication of whether the UE is to transition to the active state or remain in the inactive state during the on duration of the discontinuous reception cycle, wherein the wakeup signal indicates a physical cell identifier or the wakeup signal indicates the physical cell identifier based at least in part on an offset between the wakeup signal and the on duration; and
- means for applying, at least in response to the lack of detecting the indication, the default configuration that is indicated in the configuration signal by remaining in the inactive state instead of transitioning to the active state during the on duration.

17. The UE of claim 16, further comprising:
means for remaining in the inactive state until a monitoring occasion associated with detecting a second indication.

18. The UE of claim 16, wherein the configuration signal comprises at least one of a downlink control information (DCI), or a medium access control (MAC) control element (CE), or a radio resource control (RRC) signal, or a combination thereof.

19. The apparatus of claim 16, further comprising:
- means for receiving an indication of a configuration identifying one or more resources for transmission of a feedback signal corresponding to the wakeup signal; and
- means for transmitting the feedback signal via the one or more resources.

20. The apparatus of claim 19, wherein the feedback signal comprises a hybrid automatic/repeat request (HARQ) acknowledgement/negative-acknowledgement (ACK/NACK) message.

* * * * *